United States Patent [19]

Bolin

[11] Patent Number: 5,411,564
[45] Date of Patent: May 2, 1995

[54] PNEUMATIC PLUNGER MECHANISM FOR A GLASSWARE FORMING MACHINE

[75] Inventor: James A. Bolin, Tulsa, Okla.

[73] Assignee: I.M.T.E.C. Enterprises, Inc., Tulsa, Okla.

[21] Appl. No.: 998,473

[22] Filed: Dec. 30, 1992

[51] Int. Cl.$^6$ ............................................. C03B 11/10
[52] U.S. Cl. ........................................ 65/68; 65/171; 65/362; 65/314; 65/321
[58] Field of Search .................. 65/362, 215, 173, 171, 65/314, 356, 321, 68

[56] References Cited

U.S. PATENT DOCUMENTS

| | | | |
|---|---|---|---|
| Re. 27,153 | 7/1971 | Donnelly | 65/167 |
| 533,623 | 2/1895 | Uefig | 65/167 |
| 704,760 | 7/1902 | Sehaub | 65/261 |
| 833,295 | 10/1906 | Bock | 65/321 |
| 2,702,444 | 2/1955 | Rowe | 65/321 |
| 2,839,870 | 6/1958 | Denman | |
| 3,190,188 | 6/1965 | Donnelly | 65/323 |
| 3,203,778 | 8/1965 | Denman | 65/327 |
| 3,258,322 | 6/1966 | Donnelly | 65/167 |
| 3,273,991 | 9/1966 | Denman | 65/314 |
| 3,305,344 | 2/1967 | Colchagoff | 65/362 |
| 3,314,775 | 4/1967 | Shitler et al. | 65/322 |
| 3,585,018 | 6/1971 | Irwin | 65/323 |
| 3,595,637 | 7/1971 | Eldred et al. | 65/323 |
| 3,598,561 | 8/1971 | Hamilton | 65/322 |
| 4,272,273 | 6/1981 | Trahan et al. | 65/323 |
| 4,585,467 | 4/1986 | Trahan et al. | 65/172 |
| 4,608,075 | 8/1986 | Trahan et al. | 65/362 |
| 4,623,374 | 11/1986 | Doud | 65/362 |
| 4,629,488 | 12/1986 | Doud | 65/356 |
| 4,662,923 | 5/1987 | Vajda et al. | 65/29 |
| 4,836,839 | 6/1989 | Trahan et al. | 65/323 |
| 4,888,040 | 12/1989 | Douglas et al. | 65/302 |
| 4,889,549 | 12/1989 | Trahan et al. | 65/314 |

*Primary Examiner*—W. Gary Jones
*Assistant Examiner*—John Hoffmann
*Attorney, Agent, or Firm*—John R. Ley; John B. Phillips

[57] ABSTRACT

Both blow-and-blow and press-and-blow plunger mechanisms for use in forming a parison from a gob of fluid glass in a individual section (IS) of a glassware forming machine are fully pneumatically controlled. Plunger and thimble pistons affirmatively position a thimble and a plunger in consistently repeatable positions during loading of the gob, counterblowing or pressing an initial opening in the parison, and transferring the formed parison. No springs or other mechanical components which are prone to cause inconsistencies or failures are employed. The plunger mechanism is preferably suspended from the frame of the IS by a plunger case assembly to avoid the problems associated with a support foot. The plunger case assembly allows the plunger mechanisms to be easily interchanged or replaced, to be adjusted to accommodate different types of operation and sizes and configurations of glass article produced, while still communicating pressurized air to the plunger mechanisms to achieve these effects.

72 Claims, 8 Drawing Sheets

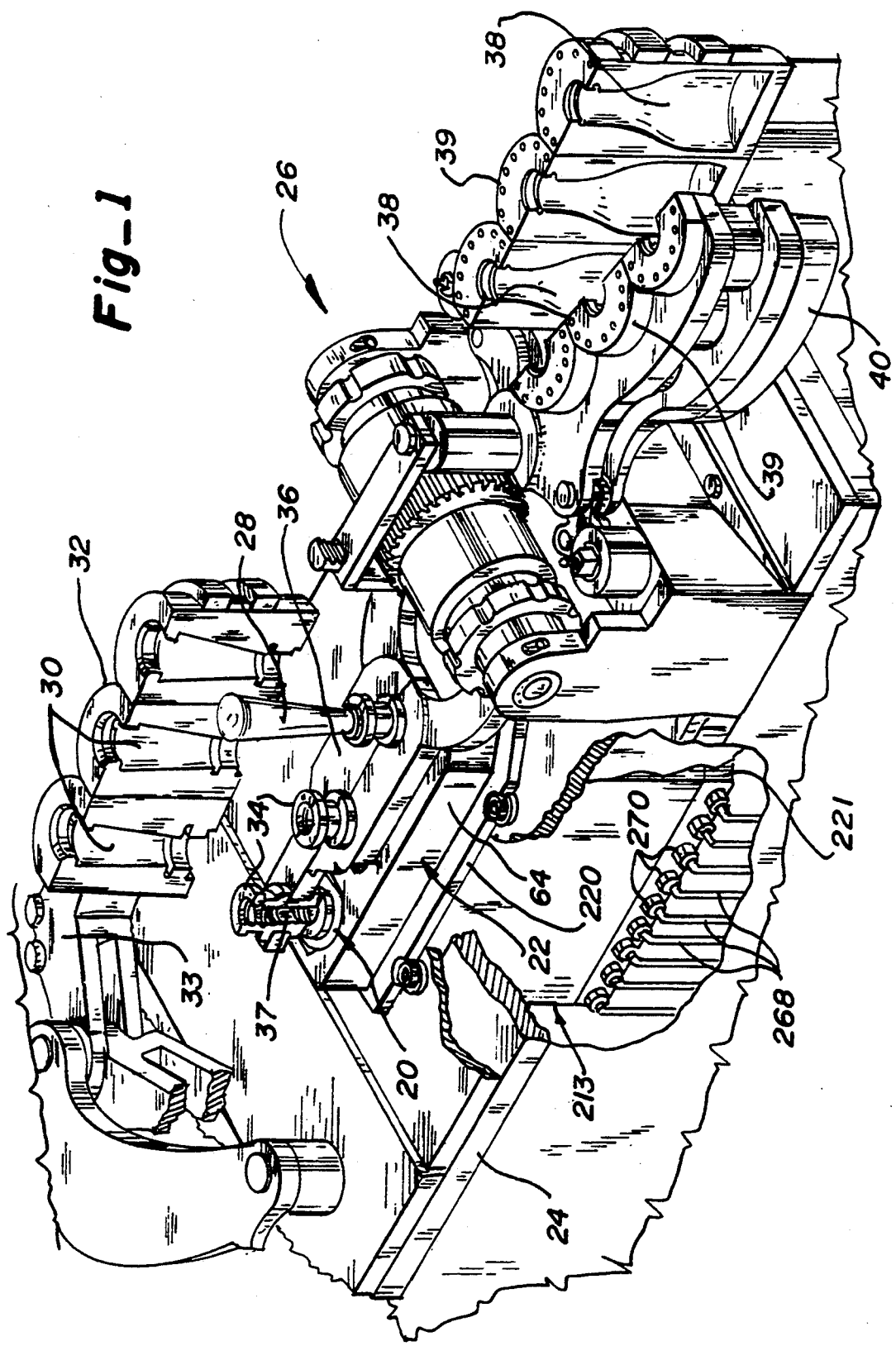

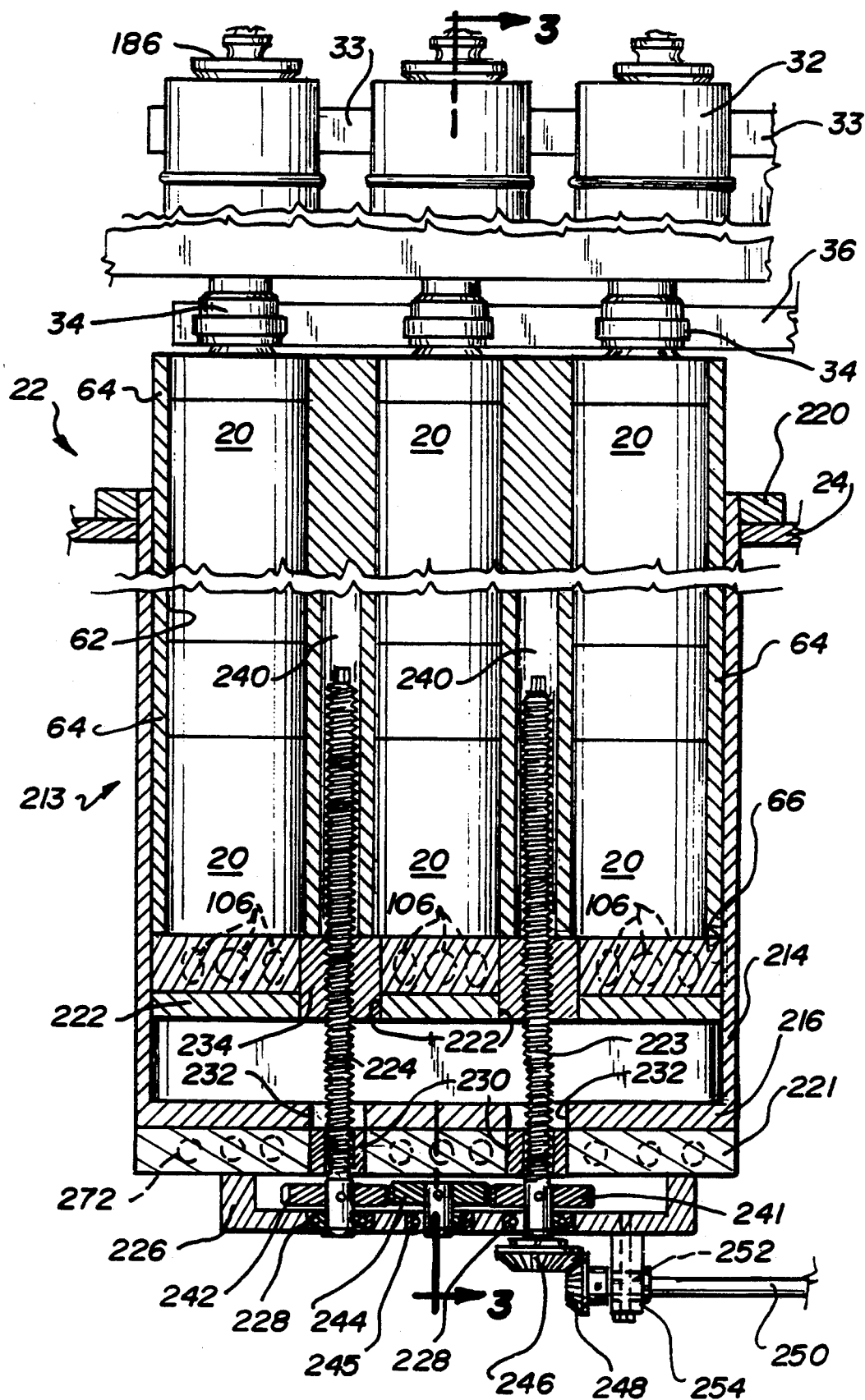
Fig_2

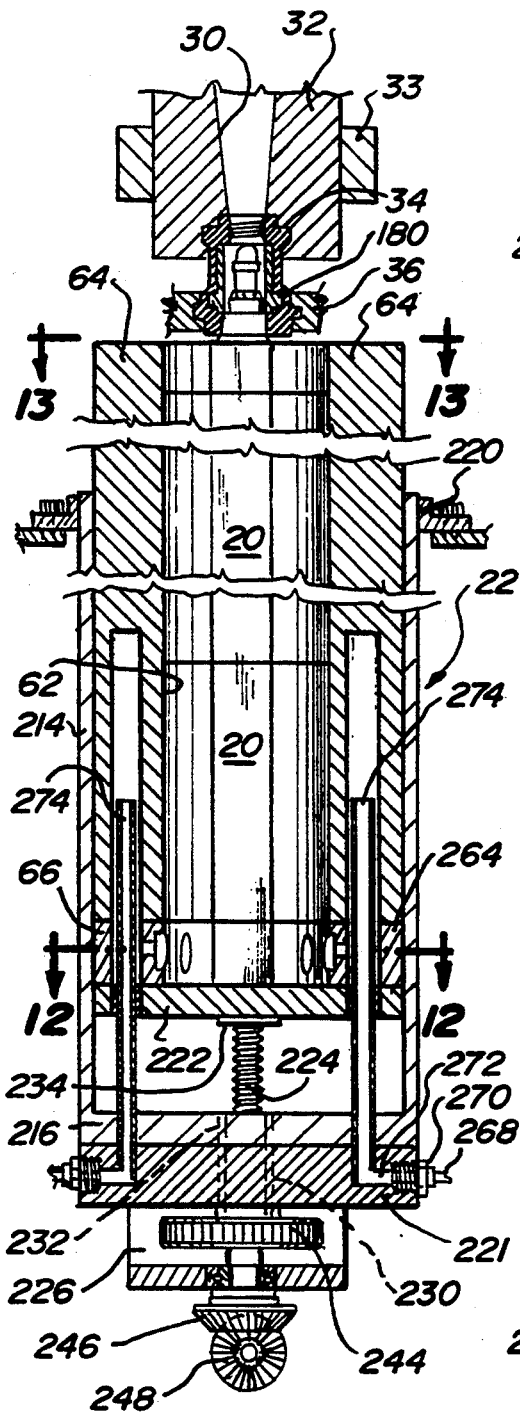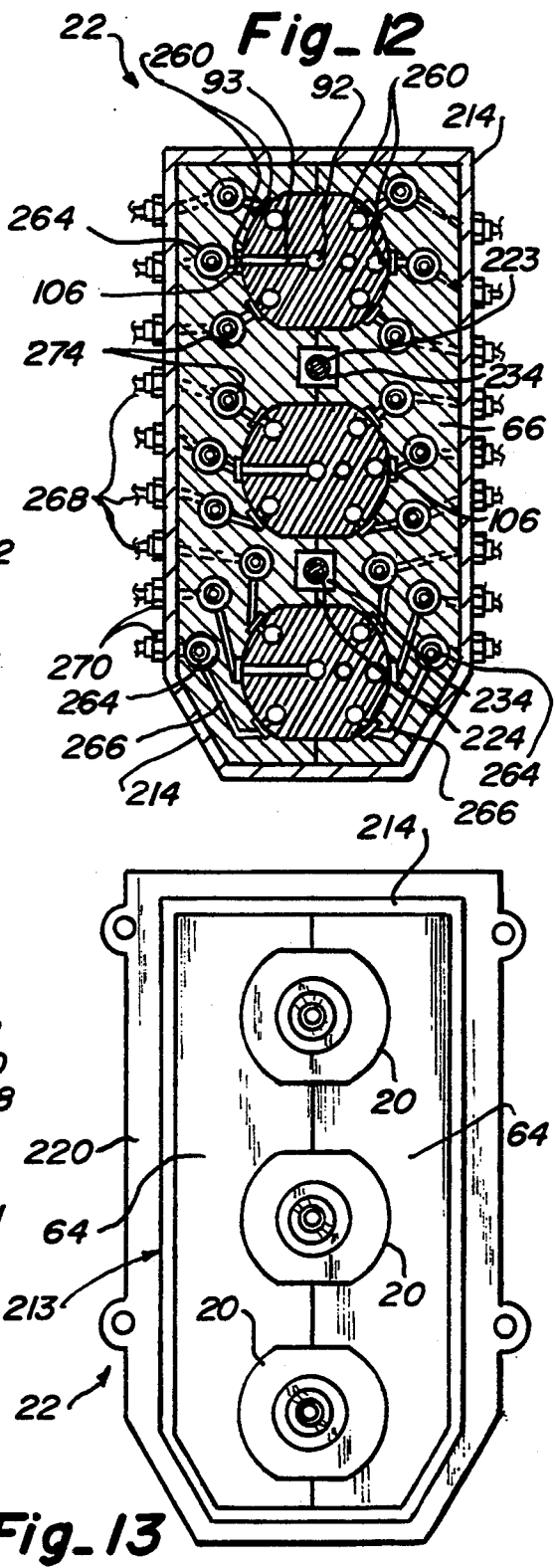

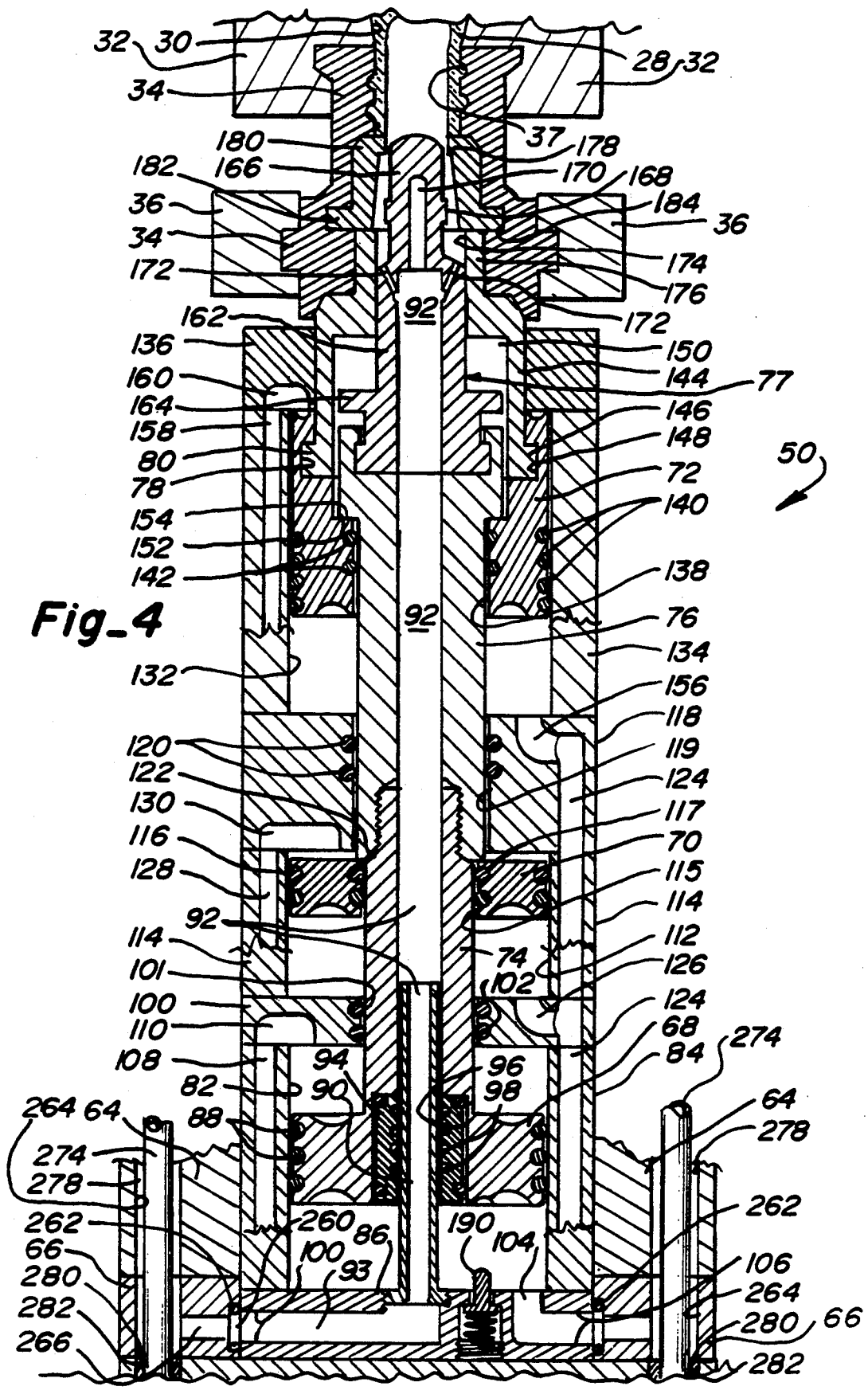
Fig_4

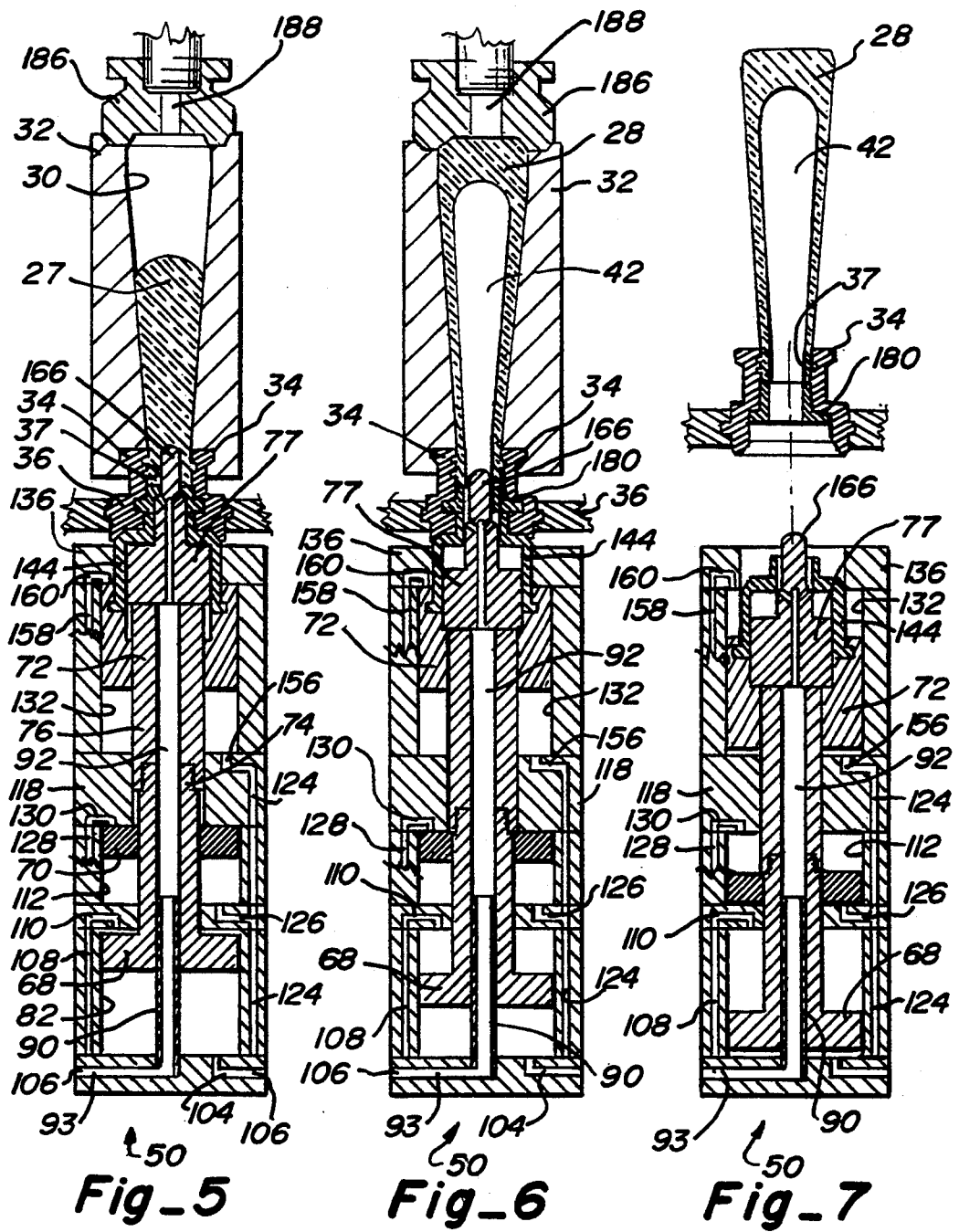

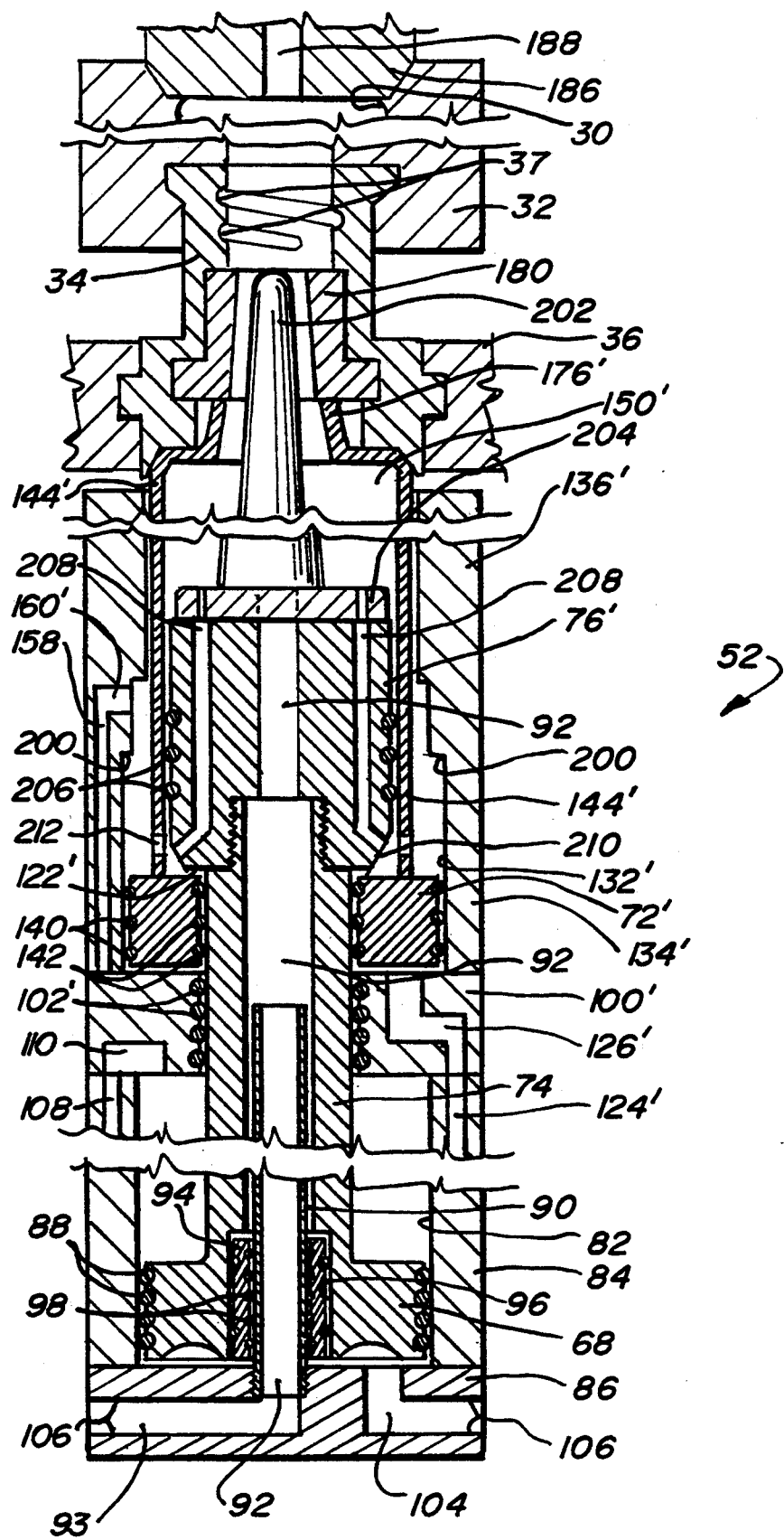
Fig_8

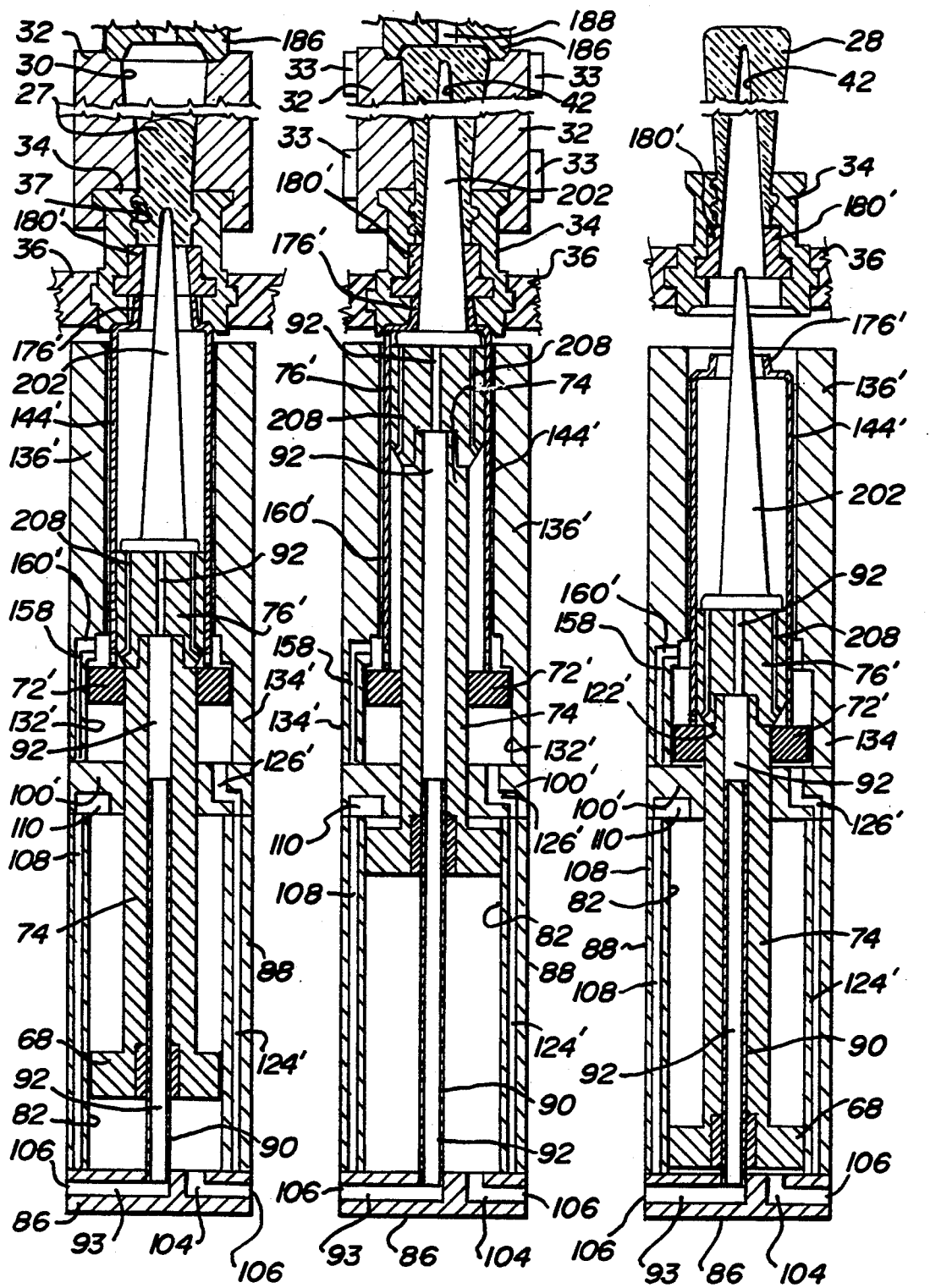

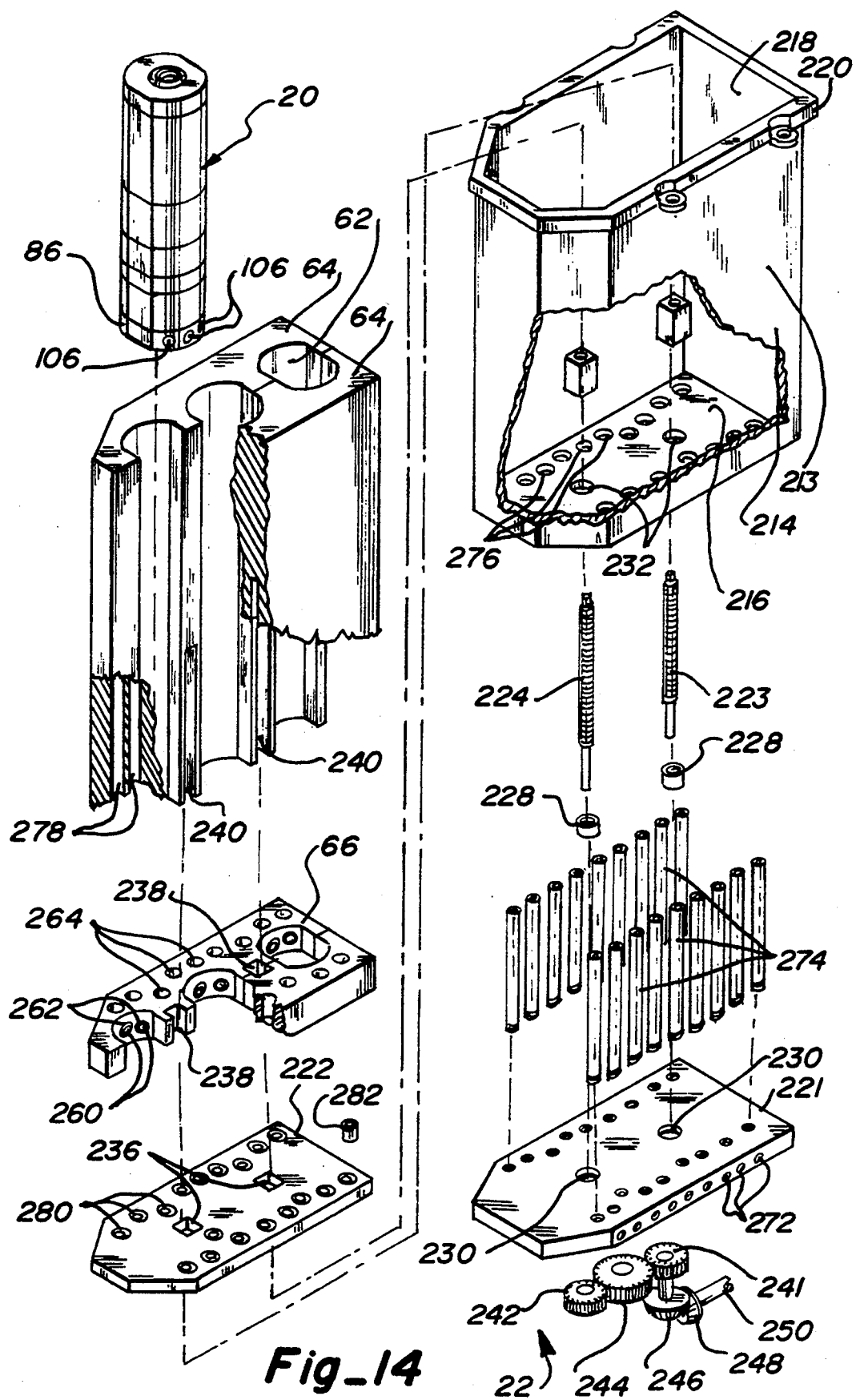
Fig_14

PNEUMATIC PLUNGER MECHANISM FOR A GLASSWARE FORMING MACHINE

This invention relates to the formation of hollow articles of glassware from gobs of molten glass. More particularly, the present invention relates to a new and improved plunger mechanism for use in forming a parison from a gob in a blank mold, during the initial stages of the formation of the glassware article.

BACKGROUND OF THE INVENTION

Mass produced hollow articles of glassware, such as bottles, jars and the like (hereinafter referred to as bottles) are usually produced by glass forming machines which are typically formed by combining a number of individual sections. Each individual section (IS or Section) is capable of manufacturing one to four bottles at a time. By combining numerous Sections in a single integrated glassware forming machine, an increased output capacity for mass producing bottles is achieved.

A bottle is formed from a measured volumetric quantity of molten glass, called a gob. One gob is delivered to each Section for each bottle which is produced. The capacity of a Section is rated in terms of the number of gobs which it is capable of forming into bottles simultaneously. For example, a triple gob IS machine is capable of producing simultaneously three bottles at a time.

The process of forming mass produced bottles begins when gobs are deposited initially into cavities of a blank mold of each Section. Each gob is formed into a first configuration called a parison in the blank mold. A parison includes a finish, which generally refers to the fully formed neck and mouth of the bottle, and a remaining body. Both the finish and the body assume an external configuration established by the shape of the cavity of the blank mold. The parison also includes an initial interior opening extending through the finish and somewhat into the body of the parison. Pressurized air is later supplied to the initial opening to expand the body of the parison into the final completed shape of the bottle.

A plunger mechanism forms the initial opening through the finish and into the fluid glass body of the parison while it is within the blank mold cavity. Thereafter the blank mold separates and the parison is transferred by an invert arm to another mold of the IS called a blow mold. In the blow mold, the fluid glass body of the parison is expanded by forcing pressurized air into the initial opening, thereby expanding the fluid glass body into the final body shape defined by the configuration of the blow mold. The bottle is thereafter removed from the blow mold and transferred onto a conveyor, which transports the bottle to other equipment for further heat treatment to complete its manufacture.

Each I.S. machine, therefore, receives the gobs of molten glass, initially forms each gob into a parison, subsequently blows each parison into the completed bottle shape, and transfers the bottle thus formed on for completion. This process repeats itself very rapidly, and it is by this process that large numbers of glass articles are produced.

IS machines are either of a blow-and-blow type or a press-and-blow type. These designations refer to the two types of operations which first form the initial opening in the parison in the blank mold and which thereafter expand the initial opening to complete the shape of the body of the bottle in the blow mold. In a blow-and-blow operation, the initial opening in the parison is formed by blowing pressurized air into a small cavity formed by a plunger tip residing in the fluid glass. After the parison is transferred to the blow mold, pressurized air is blown into the initial opening to complete the bottle shape. In a press-and-blow operation, the initial opening is completely formed by the mechanical action of pressing a ram-like plunger member into the fluid glass. After the parison is transferred to the blow mold, pressurized air is blown into the initial opening to complete the body shape. Thus, in a blow-and-blow operation, the initial opening is completed by blowing air into a small cavity to expand the cavity into the initial opening, while in a press-and-blow operation, the initial opening is formed entirely by mechanical movement.

A conventional plunger mechanism comprises a piston and cylinder assembly which is positioned directly beneath the blank mold of each IS. The plunger tip or the ram-like plunger member is typically attached to the end of a shaft connected to a piston. Mechanical springs and compressed air supplied to the interior of the cylinder combine to move the piston and thereby extend and retract the plunger tip or member at predetermined intervals during the formation of the parison. At the start of the parison forming process, a thimble of the plunger mechanism extends upward to contact a neck ring mechanism held by an invert arm to align the plunger tip or ram-like member with the blank mold cavity. A spring typically biases the thimble in its upward position, thereby establishing a "load" position in which the gob is received in the blank mold cavity. The load position is common to both the blow-and-blow and press-and-blow operations, but the remaining steps in the formation of the parison differ in the blow-and-blow and press-and-blow operations.

In the prior art blow-and-blow operation, pressurized air is applied to the piston simultaneously with the extension of the thimble to extend the plunger tip through the thimble and upward to a maximum height within the blank mold. While the plunger tip is in this "up" position, pressurized air ("settleblow air") is supplied from the top of the blank mold cavity to press the molten glass gob around the extended plunger tip to form the finish. The plunger is then lowered to an intermediate or "counterblow" position by relieving the previously applied air pressure on the piston and allowing a second spring, which was compressed by the movement of the piston to the "up" position, to expand and move the piston and attached plunger tip down to the counterblow position. Movement of the plunger from the "up" position to the "counterblow" position forms a small cavity. The small cavity is then expanded into the initial opening by blowing pressurized air past the plunger tip while in the counterblow position. Thereafter, air pressure is applied to the piston to fully retract both the plunger tip and thimble. In this last "transfer position," the first spring is once again compressed. The transfer position allows the formed parison to be moved by the invert arm to the blow mold.

The prior art press-and-blow operation employs a different sequence of plunger positions. In the "load" position, springs bias the thimble into contact with the neck ring mechanism. In addition, springs also bias the piston upward to position the plunger ram member in an intermediate position in which the plunger ram member extends partially into the blank mold cavity. The gob is transferred into the blank mold cavity while the plunger ram member is in the load position. Pressurized ("settle-blow") air is applied from the top of the blank mold cavity to force the gob downward. Pressurized air is then applied to the piston to extend the plunger ram member upward to its highest position. The upward movement of the plunger ram member presses the fluid glass to establish the finish and the shape of the parison while simultaneously forming the initial opening within the parison. Thereafter, the plunger ram member is withdrawn from the blank mold cavity by applying compressed air to the top side of the piston to move the piston downward and compress the spring below the piston. Once the plunger has returned to its lowermost position, the parison is transferred to the blow mold. When the compressed air to the top of the piston is relieved, the compressed spring will expand and move the plunger to its intermediate load position for the start of the next cycle during which a gob will be transformed into a parison.

The use of springs in the plunger mechanism to achieve the desired positions of the plunger tip or ram member in both the blow-and-blow and press-and-blow operations are prone to cause certain undesirable effects. The movement obtained from springs cannot be controlled precisely, both in terms of speed and consistency of position. The driving movement of the springs also tends to create a hammering effect between mechanical components which leads to stress and a tendency for failure of the affected components. Further, spring movement may be characterized by slight inconsistencies in timing and somewhat varied movement positions. Additionally, springs are susceptible to thermal effects due to the relatively high temperature of the molten glass gobs and the surrounding equipment of the glass forming machine. The thermal effects may create inconsistencies in both the length of the spring and the force it applies. These effects, resulting from the springs used in the prior art plunger mechanisms, can result in inconsistencies in forming the parison. Even slight inconsistencies may cause deformities in the finished bottle or other glassware article.

Furthermore, the repetitious mechanical contact of the components created by the springs moving the components of the plunger mechanism together and against one another has the tendency to create accelerated wear and fatigue on the plunger mechanism elements. The springs are also susceptible to fatigue and failure from repeated cycling, thus creating a risk of unpredictable mechanical failure. Consequently, plunger mechanisms require frequent repair and replacement of failed component parts. Of course, during times of plunger mechanism repair, the individual section must be removed from service and is therefore unavailable for the production of bottles.

Conventional plunger mechanisms are typically positioned and aligned beneath the blank mold cavities by an adjustable foot extending to the floor or the bottom of the IS machine. The adjustable foot allows the plunger mechanism to be raised or lowered to accommodate blank molds and plunger mechanisms of various sizes according to the size and shape of the bottle being produced. The adjustable foot is also used to establish the initial alignment of the plunger mechanism with the blank mold cavity.

The adjustable foot also tends to cause the prior art plunger mechanism to slip out of alignment with the blank mold cavity. The effects of thermal expansion and vibration of the I.S. machine can result in relative movement between the single alignment point at the foot and the blank mold cavity. Even slight misalignments can create deformities and unacceptable weak spots in the completed bottles.

The adjustable foot also makes repair and replacement of the plunger mechanism difficult. Mechanical failures of the elements of the plunger mechanism, and changes in the type and size of glassware produced, cause frequent removals of the conventional plunger mechanisms for repair or replacement. The adjustable foot necessitates that each replaced plunger mechanism undergo a tedious and time consuming realignment process when it is installed, which increases down time of the individual sections and decreases bottle production. Furthermore, the fact that the adjustable foot itself is connected to and a part of the conventional plunger mechanism makes removal of the plunger mechanism more difficult.

It is with respect to these considerations and other background information relative to prior art plunger mechanisms that the significant improvements of the present invention have evolved.

SUMMARY OF THE INVENTION

Aspects of the present invention relate to overcoming the deficiencies associated with the use of springs in the prior art plunger mechanisms and reducing the possibilities of mechanical failure of the plunger mechanisms due to largely uncontrollable mechanical contact or hammering of the elements due to spring forces. Another aspect of the present invention is to obtain more controllable movement of the elements of the plunger mechanism during the parison forming process to thereby obtain a better quality glassware article or bottle.

In accordance with these and other aspects, a new and improved plunger mechanism for glass forming equipment comprises a pneumatically operated plunger mechanism for use in an IS for transforming a gob of fluid glass into a parison. The parison has a body and a finish with an initial interior opening extending through the finish. The plunger mechanism includes a housing having a first cylinder which supports and positions a plunger piston and a second cylinder which supports and positions a thimble piston. A plunger is connected to move in unison with the plunger piston between an extended position in which the plunger extends into the fluid glass of the finish during the formation of the initial opening and a retracted position in which the plunger is withdrawn from the initial opening. A thimble is connected to move in unison with the thimble piston between an extended position in which to receive the gob and a retracted position in which the thimble is withdrawn after completion of the initial opening. Air passageways in the housing communicate with the cylinders to apply pressurized air to the pistons and thereby control the movement and positions of the pistons, plunger and the thimble.

In addition, the thimble piston is interoperatively connected with the plunger piston and the plunger to move the plunger and the thimble simultaneously to a load position in which the gob is received at the commencement of the parison forming sequence. This interconnection allows the thimble and the plunger to achieve the same directly-controlled, consistently-achieved load position each time a parison is formed, rather than the somewhat unpredictable positions attained from the less controllable springs. The plunger piston is also interoperatively connected with the thimble piston and the thimble to retract the plunger and the thimble after formation of the parison under the influence of pressurized air applied to the plunger piston. This interconnection allows the thimble and piston to be withdrawn in a directly-controlled, consistently-achieved manner, rather than depending on the action of less controllable springs. Further still, the interoperative connection of the thimble and plunger pistons and the application of pressurized air on the pistons creates a cushioning effect to partially oppose the force generated by the piston movement, thereby avoiding the hammering effects and other undesirable influences typically resulting from the use of springs.

Further in accordance with the above mentioned aspects, a method of pneumatically operating a plunger mechanism to achieve all of the positions of the plunger and the thimble in a blow-and-blow or a press-and-blow operation is accomplished. The pneumatic method used in the plunger mechanism includes positioning the thimble and the plunger in the load position to receive the gob, moving the plunger to a counterblow position to expand the initial opening and the body of the parison to their full sizes in a blow-and-blow operation, or moving the plunger to a pressing position to expand the initial opening and the body of the parison to their full sizes in a press-and-blow operation, and withdrawing the plunger and the thimble to a position in which the parison thus formed may be transferred. The pneumatic control allows for precise positioning of the thimble and the plunger and also achieves a cushioning stop effect when moving the plunger and the thimble.

Other aspects of the present invention relate to obtaining more consistent alignment of the plunger mechanism with the blank mold cavity, independent of thermal expansion and vibration of the IS, and to obtaining greater convenience in replacing or repairing the plunger mechanism.

In accordance with these and other aspects, the plunger mechanism is used in combination with a plunger case assembly which positions the plunger mechanism in the IS beneath a neck ring retained in an invert arm of the IS. A liner member of the plunger case assembly has a plunger opening formed therein to receive the plunger mechanism. Preferably the blow-and-blow and the press-and-blow plunger mechanism have similar exterior configurations, thereby allowing either type of plunger mechanism to be interchanged in the plunger opening. The plunger case assembly supplies the pressurized air to the plunger mechanism through ports which are located at predetermined locations to communicate with the openings to the air passageways in either type of plunger mechanism. Consequently, the interchange and the replacement of plunger members by removal of them from the plunger openings is facilitated, because air conduits need not be connected to or removed from the plunger mechanisms.

The plunger case assembly preferably includes a basket which contains the liner member and the plunger mechanism. The basket is attached to the frame of the I.S. machine to suspend the liner member and the plunger mechanism from the I.S. machine without the need of a support foot which is commonly used in the prior art. Consequently the effects of thermal expansion, vibration and adjustment associated with the support foot are all avoided, making the positioning and the adjustment of the plunger mechanism more convenient and considerably less susceptible to change.

In addition, the plunger case assembly includes means connected to the basket for raising and lowering the liner member and the plunger mechanism to adjust the position of the plunger relative to the neck ring. This adjustment capability facilitates the adjustment of the plunger mechanisms for different types of operation and for the formation of different sizes and configurations of bottles and parisons. The plunger case assembly includes means for maintaining a pressurized air conduit between supply lines connected to the plunger case assembly and the plunger mechanism while the raising and lowering movement is achieved, to again achieve convenience in replacing, interchanging or adjusting the position of, the plunger mechanisms.

A more complete appreciation of the present invention and its scope can be obtained from the accompanying drawings, which are briefly summarized below, the following detailed description of presently preferred embodiments of the invention, and the appended claims.

BRIEF DESCRIPTION OF THE DRAWINGS

FIG. 1 is a partial perspective view of an I.S. machine generally illustrating a plunger mechanism and a plunger case assembly of the present invention, and a blank mold, an invert arm, neck rings, a blow mold and conventional other features of an individual section.

FIG. 2 is a vertical section view of the plunger case assembly, taken substantially in a plane through an axis through each of the plunger mechanisms, with elements of the plunger mechanism, the blow mold, the invert arm, and the neck rings shown in elevation.

FIG. 3 is a partial vertical section view of the plunger case assembly, taken substantially in the plane of line 3—3 of FIG. 2, which illustrates additional features of the blow mold, the invert arm, and a neck ring.

FIG. 4 is a vertical section view taken through the axis of a plunger mechanism of the present invention used in a blow-and-blow operation in the IS shown in FIG. 1. Portions of a case assembly of the plunger mechanism are rotated with respect to one another at break lines to illustrate passageways formed therein at different positions. FIG. 4 is also a partial view of the plunger case assembly of the present invention as shown in FIG. 1. FIG. 4 further illustrates in greater detail portions of a parison, the blank mold cavity, the invert arm and the neck rings of the IS shown in FIG. 1.

FIGS. 5, 6, and 7 are generalized vertical sectional views illustrating the operation and position of the elements of the plunger mechanism shown in FIG. 4 and other elements of the IS shown in FIG. 1, in a load position, a counterblow position and a transfer position, respectively, during formation of a parison in a blow-and-blow process.

FIG. 8 is a vertical section view taken through the axis of a plunger mechanism of the present invention used in a press-and-blow operation in the IS shown in FIG. 1. Portions of a case assembly of the plunger mechanism are rotated with respect to one another at break lines to illustrate passageways formed therein at different positions. FIG. 8 further illustrates in greater detail portions of the blank mold cavity, the invert arm and the neck rings of the IS shown in FIG. 1.

FIGS. 9, 10, and 11 are generalized vertical sectional views illustrating the operation and position of the elements of the plunger mechanism shown in FIG. 8, in a load position, a press position, and a transfer position, respectively, during formation of a parison in a press-and-blow process.

FIG. 12 is a horizontal section view taken substantially in the plane of line 12—12 of FIG. 3.

FIG. 13 is a horizontal section view taken substantially in the plane of line 13—13 of FIG. 3.

FIG. 14 is an exploded view of the components of the plunger case assembly of the present invention shown in FIGS. 1, 2, 3, 4, 12 and 13.

DETAILED DESCRIPTION

Presently preferred embodiments of a plunger mechanism 20 and a plunger case assembly 22, which incorporate the present invention, are illustrated in FIG. 1 connected to an individual section (IS) 26 of a glassware forming machine. Each plunger mechanism 20, three of which are illustrated in FIG. 1, is positioned within the plunger case assembly 22, and the plunger case assembly 22 is connected in a suspended manner from a frame member 24 of the IS 26. Each plunger mechanism 20 plays an important role in transforming a gob 27 (FIGS. 5 and 9) of molten glass into a parison 28.

Each parison 28 is formed in a mold cavity 30 which is formed by closing or moving together two blank mold halves 32, only one of which is shown in FIG. 1. The blank mold halves 32 are attached to and carried by moveable arms 33 which move the blank mold halves together while the parison 28 is formed and then separate or open the blank mold halves, as shown in FIG. 1, after the parison 28 has been formed. The blank mold halves 32 define three separate blank mold cavities 30. The plunger case assembly 22 positions one plunger mechanism 20 immediately below each of the blank mold cavities 30 formed by the closed blank mold halves 32. Each blank mold cavity receives one gob 27 to be formed into a parison 28. Accordingly, the type of IS machine 26 shown in FIG. 1 is known as a triple gob IS. It should be understood that the present invention can be applied to any type of IS machine where one or more gobs 27 are each formed into a parison.

Located immediately below each blow mold cavity 30 is a neck ring 34 which is attached to an invert arm 36. The neck ring 34 is formed in two halves, and each neck ring half is attached to separate halves of the invert arm 36. The invert arm 36 moves the two halves of the neck ring 34 together beneath the blow mold cavity, and a finish molding portion 37 of the neck ring 34 is formed in the interior of the adjoining halves of the neck ring 34. The finish of the bottle and parison 28 is formed in the finish molding portion 37 and the body of the parison 28 is formed in the blank mold cavity 30.

After the parison 28 is formed, the blank mold halves 32 separate, and the invert arm 36 moves the parisons 28 in a semicircular movement (clockwise as shown in FIG. 1) to invert and position the parisons 28 to be received in a blow mold cavity 38. The halves of the invert arm 36 remain together to hold the halves of the neck ring 34 around the finish of the parison 28, thereby holding the parisons 28 during movement of the invert arm 36.

Once the parisons 28 are in position to be received in the blow mold cavity 38, two blow mold halves 39 move together and capture each parison in a blow mold cavity 38. The blow mold halves 39 are attached to and carried by moveable arms 40 which move the blow mold halves together and apart. Once the parisons 28 are within the blow mold cavities 38, the halves of the invert arm 36 separate and the halves of the neck ring 34 move apart to release the finish of each parison 28. The invert arm 36 then rotates in the reverse direction (counterclockwise as shown in FIG. 1) and the halves of the invert arm 36 and the neck ring 34 move back together prior to the commencement of the formation of another parison.

The body of the parison 28 is expanded to the fully formed configuration of the bottle while in the blow mold cavity 38. The finish of the bottle has previously been formed and is not altered by the processing which occurs in the blow mold cavity 38. The halves of the blow mold 39 then separate as shown in FIG. 1, and the fully formed bottles are removed from the IS 26 by a take-out mechanism (not shown) and placed by a pusher mechanism (not shown) on a conveyor belt (not shown) which carries the fully formed bottles away from the IS machine.

Details regarding the halves of the blank mold 32, their mold cavities 30, the opening and closing of the blank mold halves, the finish molding portion 37, the nature and operation of the halves of the invert arm 36 and neck ring 34, other aspects of the IS, and other aspects of the parison forming procedure, except those associated with the plunger mechanism 20 and the plunger case assembly 22, are described in abbreviated detail below due to their well known and conventional nature.

One of the important functions of the plunger mechanism 20 is to form an initial opening 42 in the parison 28 prior to its transfer to the blow mold 39. The initial opening 42 receives the air pressure applied in the blow mold cavity 38 to expand the fluid glass of the parison 28 into the fully formed configuration of the bottle as determined by the shape of the blow mold cavity 38. There are two operations by which the initial opening 42 in the parison is formed in the parison. In a blow-and-blow operation, air pressure is supplied from the plunger mechanism 20 to blow the initial opening 42 into the parison 28. In a press-and-blow operation, the plunger mechanism 20 presses an elongated plunger into the blank mold cavity 30 to completely form the initial opening 42 by mechanical pressure on the fluid glass. Regardless of whether the initial opening 42 is formed by blowing or pressing, blowing is used to expand the initial opening 42 and transform the body of the parison 28 into the fully formed bottle in the blow mold cavity 38.

To accomplish blow-and-blow operations, the type of plunger mechanism 20 used is a blow-and-blow plunger mechanism 50, such as is shown in FIG. 4. The functions of the blow-and-blow plunger mechanism 50 during the formation of a parison 28 are shown in FIGS. 5-7. To accomplish press-and-blow operations, the type of plunger mechanism 20 used is a press-and-blow plunger mechanism 52, such as is shown in FIG. 8. The functions of the press-and-blow plunger mechanism 52 during the formation of a parison 28 is shown in FIGS. 9-11. Both of the plunger mechanisms 50 and 52 operate completely in response to the application of pressurized air or reduced pressure air (partial vacuum) supplied to the plunger mechanisms by communication passages formed in the plunger case assembly 22.

Either the blow-and-blow plunger mechanism 50 or the press-and-blow plunger mechanism 52 can be used, and interchanged with one another, in the plunger case assembly 22 shown in FIGS. 2, 3 and 12-14. Thus it is possible to change the I.S. machine from blow-and-blow operations to press-and-blow operations, or vice versa, by simply replacing the plunger mechanisms.

The plunger mechanisms 50 and 52 are each retained in a vertical opening 62 formed by two mirror-image shaped cylinder liner members 64. The opening 62 is also replicated by and extends through two mirror-image ported block members 66 which are positioned vertically below the cylinder liner members 64. The opening 62 has the cross-sectional configuration of a cylinder which is truncated by two parallel straight sides, as shown in FIGS. 12 and 13. The cross-sectional configuration of each plunger mechanism 50 and 52 is the same as the opening 62, and each plunger mechanism 50 and 52 may vertically slide into each opening 62 with a relatively close tolerance between the exterior of the plunger mechanism and the opening 62. This arrangement allow an interchange of the types of plunger mechanisms 50 and 52 in the plunger case assembly 22 by simply removing one type of plunger mechanism 50 or 52 vertically from the opening 62 and replacing it with the other type of plunger mechanism 52 or 50. Failed plunger mechanisms may also be conveniently replaced in a similar manner.

The ported block 66 communicates pressurized air into and out of the plunger mechanisms 50 and 52, when the plunger mechanisms are positioned in the openings 62. The plunger mechanisms 50 and 52 operate in response to the application of the pressurized air to transform the gobs 27 into parisons 28 and to form the initial openings 42 into the body of the parisons 28, as is discussed below.

The details of a presently preferred embodiment of the blow-and-blow plunger mechanism 50 are shown in FIG. 4. The plunger mechanism 50 includes three separate pneumatically operating pistons 68, 70 and 72 to control the position and movement of the components of the plunger mechanism 50. The pistons 68, 70 and 72 are referred to as the plunger piston, the plunger stop piston, and the thimble piston, respectively. The plunger piston 68 is attached to a plunger shaft 74, and the plunger shaft 74 extends axially upwardly in the plunger mechanism 50. The upper end of the plunger shaft 74 is connected to a plunger adapter 76, preferably by means of threaded connections on the upper end of the plunger shaft 74 and the lower end of the plunger adapter 76.

A plunger 77 is attached to the upper end of the plunger adapter 76. The plunger 77 forms the mouth in the finish of the parison and the bottle and also initiates the formation of the initial opening 42 in the parison. A radially inwardly facing groove 78 on the upper end of the plunger adapter 76 receives a radially outward extending flange 80 at the bottom end of the plunger 77 to hold the plunger adapter 76 and plunger 77 together. Although not shown, the upper portion of the plunger adapter 76 adjacent the flange 80 may be made separate from the remaining portion of the plunger adapter 76 to allow the flange 80 to be captured in the groove 78 before these separate portions of the plunger adapter 76 are united. Connected in this manner, the plunger piston 68 and the plunger 77 move in unison.

The plunger piston 68 preferably has an annular outer configuration. The plunger piston 68 moves within a cylinder 82 defined by a sleeve-like lower housing member 84. A lower end plate 86 is connected to the bottom of the lower housing member 84, and the end plate 86 closes the cylinder 82 at the bottom of the lower housing member 84. The end plate 86 limits the lower movement of the piston 68. O rings 88 provide an airtight seal between the piston 68 and cylinder 82.

A coaxial center tube 90 is attached to the end plate 86 and extends partially into a coaxial center opening 92 formed in the plunger piston 68, the plunger shaft 74, the plunger adapter 76 and into the plunger 77. A passageway 93 is formed in the lower end plate 86 between the interior of the tube 90 and an opening 106 located on the exterior of the lower plate member at the exterior of the plunger mechanism. Pressurized air is supplied to the center opening 92 through the opening 106 and the passageway 93. An insert 94 is attached within an enlarged lower recess 96 of the center opening 92 adjacent to the plunger piston 68. O rings 98 within the insert 94 seal the insert 94 to the shaft 74 and to the center tube 90. The O rings 98 establish an airtight or hermetic seal as the plunger piston 68 and shaft 74 move vertically over the center tube 90.

A lower stop plate 100 is connected to the top of the lower housing member 84 to close the upper end of the cylinder 82. The lower stop plate 100 limits the upward movement of the piston 68. The lower stop plate 100 includes a center opening 101 through which the plunger shaft 74 extends. O rings 102 located in the opening 101 provide a seal between the stop plate 100 and the outer annular surface of the plunger shaft 74. The distance between the lower stop plate 100 and the end plate 86 dictates the stroke of the plunger piston 68.

Upward movement of the plunger piston 68 is accomplished by the application of pressurized air applied through a passageway 104 which extends through the end plate 86 and enters the cylinder 82 below the plunger piston 68. An opening 106 in the exterior of the end plate 86 at the exterior of the plunger mechanism 50 admits pressurized air into the passageway 104. Air in the cylinder 82 is communicated out of the cylinder 82 through the passageway 104 and the opening 106 when the piston moves downward in the cylinder 82.

Downward movement of the plunger piston 68 is accomplished by the application of pressurized air applied through a passageway 108 which is formed in the lower housing member 84 and the end plate 86. Although not shown in FIG. 4, an opening in the lower end plate 86 similar to that shown at 108 admits pressurized air into the passageway 108. An elbow branch 110 formed in the lower stop plate 100 allows the passageway 108 to communicate with the top of the plunger piston 68 in the cylinder 82. Pressurized air supplied through the passageway 108 and the elbow branch 110 moves the piston 68 downward. Air is communicated out of the elbow branch 110 and the passageway 108 when the piston 68 moves upward.

The plunger stop piston 70 has an annular outer configuration and moves within a cylinder 112 formed by a middle housing member 114 attached to the top of the lower stop plate 100. The plunger stop piston 70 includes a center annular opening 115 to allow the piston 70 to move vertically relative to the upper end of the plunger shaft 74 within the cylinder 112. O rings 116 and 117 respectively provide airtight seals between the middle housing member 114 and the piston 70, and between the piston 70 and the shaft 74. The lower stop plate 100 closes the bottom of the cylinder 112.

An upper stop plate 118 is connected to the upper end of the middle housing member 114 to close the top of the cylinder 112. An annular center opening 119 is formed in the upper stop plate 118 to allow the plunger adapter 76 to move axially relative to the upper stop plate 118. O rings 120 provide an airtight seal in the annular center opening 119 between the upper stop plate 118 and the lower portion of the plunger adapter 76. The distance between the lower stop plate 100 and the upper stop plate 118 dictates the stroke of the plunger stop piston 70.

The diameter of the plunger adapter 76 is greater than the diameter of the plunger shaft 74. Therefore, at the connection of the plunger adapter 76 to the plunger shaft 74, the diameter of the adapter 76 extends radially beyond the diameter of the shaft 74 to form a shoulder 122. Contact between the upper surface of the plunger stop piston 70 and the shoulder 122 allows the plunger stop piston 70 to move the adapter 76 upward. Thus, the plunger stop piston 70 may help to raise the plunger 77 or maintain the plunger 77 in a partially raised position as described in greater detail below.

Upward movement of the plunger stop piston 70 is accomplished by the application of pressurized air applied through a passageway 124 which extends from the end plate 86. An opening (FIG. 12), similar to the opening 106 shown in FIG. 4, in the exterior of the end plate 86 at the exterior of the plunger mechanism 50 admits pressurized air into the passageway 124. Since the passageway 124 is in a different circumferential location than the passageway 104 and the opening 106 (as understood from FIG. 12), the opening which communicates with the passageway 124 is not shown in FIG. 4. The passageway 124 vertically extends through the lower housing member 88, the lower stop plate 100, the middle housing member 114, and into the upper stop plate 118. An elbow branch 126 is formed in the lower stop plate 100 to communicate pressurized air from the passageway 124 into the cylinder 112 at a position below the plunger stop piston 70. Thus the application of air pressure in the passageway 124 is communicated into the cylinder 112 below the plunger stop piston 70, tending to raise the piston 70. Air in the cylinder 112 is removed from the cylinder 112 through the elbow branch 126, the passageway 124 and the opening 106 when the piston 70 moves downward in the cylinder 112.

Downward movement of the plunger stop piston 70 is accomplished by the application of pressurized air applied through a passageway 128 which is formed in the middle housing member 114. The passageway 128 also vertically extends through the lower stop plate 100, the lower housing member 84 and into the end plate 86, but the circumferential location of the passageway 128 is different than that of passageway 108 shown in FIG. 4, so the complete extension of the passageway 128 into the end plate 86 is not shown in FIG. 4. An opening (FIG. 12) similar to that shown at 106 is formed in the end plate 86 at the exterior of the plunger mechanism 50 to admit pressurized air into the passageway 128. An elbow branch 130 is formed in the upper stop plate 118 to allow the passageway 128 to communicate with the top of the plunger stop piston 70 in the cylinder 112. Pressurized air supplied through the passageway 128 and the elbow branch 130 moves the stop piston 70 downward. Air is removed from the cylinder 112 through the elbow branch 130 and the passageway 128 when the stop piston 70 moves upward.

The thimble piston 72 moves vertically within a cylinder 132 defined by an upper housing member 134. The upper housing member 134 is connected to the upper surface of the upper stop plate 118. A upper end plate 136 connects to the upper end of the upper housing member 134 to complete the plunger mechanism 50 and define the other end of the cylinder 132. The distance between the upper end plate 136 and the upper stop plate 118 dictates the stroke of the thimble piston 72 within the cylinder 132.

The thimble piston 72 has an annular center opening 138 to allow for vertical movement of the thimble piston 72 relative to the plunger adapter 76. O rings 140 and 142 respectively provide airtight seals between the inner cylindrical surface of the upper housing member 134 and an outer annular surface of the thimble piston 72, and between the thimble piston 72 and the exterior annular surface of the plunger adapter 76 at the center opening 138.

An annularly shaped thimble 144 is connected to the upper end of the thimble piston 72. The connection is achieved by conventional means, which may include receiving a radially outward extending flange 146 on the lower end of the thimble 144 within a corresponding radially inwardly facing annular groove 148 at the upper end of the thimble piston 72. Although not shown, the upper end of the thimble piston in the area of the groove 148 may be made separate from the remaining portion of the piston 72 in order to separate and capture the flange 146 in the groove 148, and then reconnect to complete the piston 72.

The thimble 144 has an open interior 150 within which to receive the plunger 77 and allow it to be connected to the upper end of the plunger adapter 76 as discussed above and to allow it to move as discussed below.

The upper end of the plunger adapter 76 includes a shoulder 152 which extends radially outward and contacts a shoulder 154 of the thimble piston 72. Contact between the shoulders 152 and 154 allows the thimble piston 72 to apply upward force on the plunger adapter 76 and on the plunger 77. Thus, upward movement of the thimble piston 72 contributes to upward movement of the plunger 77, the plunger adapter 76 and the plunger piston 68 and shaft 74, while downward movement of the plunger adapter 76 pushes the thimble piston 72 downward when the shoulders 152 and 154 are in contact.

Upward movement of the thimble piston 72 is accomplished by the application of pressurized air through the passageway 124. An elbow branch 156 is formed in the upper stop plate 118 to communicate pressurized air from the passageway 124 into the cylinder 132 at a position below the thimble piston 72. Thus the application of air pressure in the passageway 124 is communicated into the cylinder 132 below the thimble piston 72, tending to raise the piston 72. Air in the cylinder 132 is removed through the elbow branch 156, the passageway 124 and an opening 106 (FIG. 12) in the exterior of the plunger mechanism 50 when the piston 72 moves downward in the cylinder 132.

Downward movement of the thimble piston 72 is accomplished by the application of pressurized air through a passageway 158 which is formed in the upper housing member 134. The passageway 158 also vertically extends through the upper stop plate 118, the middle housing member 114, the lower stop plate 100, the lower housing member 84 and into the end plate 86, but the circumferential location of the passageway 158 is different than that of the passageway 124 shown in FIG. 4, so the complete extension of the passageway 158 into the end plate 86 is not shown in FIG. 4. An opening 106 (FIG. 12) is formed in the end plate 86 at the exterior of the plunger mechanism 50 to admit pressurized air into the passageway 158. An elbow branch 160 is formed in the upper end plate 136 to allow the passageway 158 to communicate with the top surface of the thimble piston 72 in the cylinder 132. Pressurized air supplied through the passageway 158 and the elbow branch 160 moves the thimble piston 72 downward. Air is removed from the cylinder 132 above the thimble piston 72 through the elbow branch 160 and the passageway 158 when the piston 72 moves upward.

The plunger 77 includes an annularly shaped main body portion 162 from which the flange 80 extends at the bottom end. The main body portion 162 extends upwardly from the plunger adapter 76, and the center opening 92 also continues upward from the plunger adapter 76 through the main body portion 162. A radial flange ring 164 extends outward from the plunger 77 at a location above the plunger adapter 76 within the interior opening 150 of the thimble 144. An annularly shaped capped tip portion 166 of the plunger 77 extends upwardly from the main body portion 162. The capped tip portion 166 is of a lesser diameter than the diameter of the main body portion 162. A small flange 168 extends radially outward from the capped tip portion at an axial location midway between the main body portion 162 and the upper end of the capped tip portion 166. An extension 170 extends from the center opening 92 into the capped tip portion 166, and counterblow ports 172 extend from the center opening 92 through the main body portion 162 to the location where the main body portion and the capped tip portion join one another. The counterblow ports 172 are formed in only a few radial locations, such as the two diametrically opposed locations shown in FIG. 4.

The thimble 144 includes a center annular opening 174 which receives the cylindrical shaped main body portion 162 of the plunger 77 when the plunger 77 is moved upward. A sleeve portion 176 extends upward from the thimble 144 and helps define the center opening 174 in the thimble. The center opening 174 assists in guiding the plunger 77 upward during the formation of the parison. In addition, the flange 168 on the capped tip portion 166 extends into an annular opening defined by a rim 178 in a guide ring 180 which is held in the neck ring 34, thereby centering the capped tip portion 166 of the plunger 77 when the plunger 77 moves upward. The guide ring 180 includes a flange 182 which is received in a groove 184 of the neck ring 34. The guide ring 180 is retained in the halves of the neck ring 34 even when they separate because the width of the separation is insufficient to allow the flange 182 of the guide ring 180 to withdraw from the groove 184 in the halves of the neck ring 34.

The upper end plate 136, the upper housing member 134, the upper stop plate 118, the middle housing member 114, the lower stop plate 100, the lower housing member 84 and the lower end plate 86 are held together by conventional means such as long bolts (not shown) extending through vertical passageways (not shown) in the housing members and plates, in order to maintain the plunger mechanism 50 in an assembled configuration.

To form a parison 28 in a blow-and-blow operation, pressurized air is supplied to the passageways 93, 104, 108, 124, 128 and 158, and the pistons 68, 70 and 72 are appropriately manipulated as described below and illustrated in FIGS. 5 to 7.

At the start of a blow-and-blow parison-forming cycle as shown in FIG. 5, compressed air is introduced into the passageway 124. The pressurized air simultaneously moves both the plunger stop piston 70 and the thimble piston 72 upward. Air within the upper portions of the cylinders 112 and 132 is vented through the passageways 128 and 158, respectively, as the pistons 70 and 72 are raised. Upward movement of the pistons 70 and 72 causes them to contact the shoulders 122 and 152, respectively, and the pistons 70 and 72 push the connected assembly of the plunger piston 68, the plunger shaft 74, the plunger adapter 76, the plunger 77, and the thimble 144 upward to the full extent of the equal stroke of the pistons 70 and 72. Once the thimble piston 72 reaches its greatest height, the sleeve portion 176 on the thimble 144 contacts the guide ring 180 within the neck ring 34. Contact between the sleeve portion 176 of the thimble 144 and the guide ring 180 aligns the neck ring 34 so that the plunger 77 will be properly aligned with the finish molding portion 37.

Next, compressed air is applied through the passageway 104 to further raise the plunger piston 68 within the cylinder 82. The plunger piston 68 travels upward to the full extent of its stroke, while air within the upper portion of the cylinder 82 is vented through the elbow branch 110 and passageway 108. The shoulders 122 and 152 of the plunger adapter 76 move upward beyond the plunger stop piston 70 and the shoulder 154 of the thimble piston 72, respectively, to push the attached plunger 77 further up through the thimble 144 until the flange 168 on the capped tip portion 166 extends into the annular opening defined by the rim 178 of the guide ring 180. Contact between the flange 168 on the capped tip portion 166 and the rim 178 of the guide ring 180 aligns the capped tip portion 166 within the center of the finish molding portion 37 of the neck ring 34 to assure proper alignment during formation of the finish portion of the bottle. This position is known as the load position, and is illustrated in FIG. 5.

Once in the load position, a gob 27 of molten glass is loaded into the blank mold cavity 30 through the upper open end of the cavity 30. A conventional sealing member 186 is then pressed against the top of the blank mold cavity 30, and air pressure is applied through a channel 188 of the sealing member 186 to force the gob 27 downward. A portion of the gob 27 surrounds the capped tip portion 166 of the plunger 77 and is forced into the finish molding portion 37 of the neck ring 34. This condition is referred to as the settle blow condition and it is achieved in the load position. It is in this settle blow condition that the finish of the parison 28 is formed.

In the next step in the sequence, shown in FIG. 6, the pressurized air previously applied through the passageway 104 is relieved by exhausting air therefrom, and low pressure air is introduced onto the top of the plunger piston 68 from the passageway 108. The plunger stop piston 70 and the thimble piston 72 remain in their fully upward position due to the continued presence of air in the passageway 124 of higher pressure than the air in the passageway 108. The plunger piston 68 moves gently downward within the cylinder 82 until movement of the plunger piston 68 is arrested by contact between the shoulder 122 on the plunger adapter 76 and the upper portion of the plunger stop piston 70. The downward movement of the plunger piston 68 causes the capped tip portion of the plunger 77 to partially withdraw from the neck ring 34, leaving a small cavity in the fluid glass in the neck region of the parison 28. The thimble 144, however, remains in the thimble up position and maintains the alignment of the plunger 77 with the finish molding portion 37. This position is referred to as the counterblow position.

In the counterblow position, pressurized air is directed through the passageway 93 and center tube 90 and into the center opening 92. The center tube 90 and the center opening 92 in the blow-and-blow plunger mechanism 50 define a counterblow air channel which communicates with the counterblow ports 172. The air is emitted from the counterblow ports 172 within the plunger 77 and flows past the guide ring 180 and into the cavity formed by the withdrawal of the capped tip portion 166 from the fluid glass within the finish molding portion 37. The air enlarges the small cavity and expands the fluid glass to form the initial opening 42 in the parison 28 and complete the formation of the body portion of the parison 28. During the formation of the initial opening 42 and the completion of the body of the parison 28, a vent through the channel 188 of the sealing member 186 is provided to allow the fluid glass to expand throughout the blank mold cavity 30 to complete the body portion of the parison 28.

The last step in the parison forming sequence is shown in FIG. 7. The pressurized air supplied from the center opening 92 to the counterblow ports 172, and the pressurized air supplied from the passageway 124 to the underside of pistons 70 and 72, is relieved. Since the plunger stop piston 70 no longer restrains the downward movement of the plunger adapter 76 and the attached shaft 74, the pressurized air applied to the top of the plunger piston 68 causes it to move to the bottom of the cylinder 82. A small bumper 190 in the lower end plate 86 cushions the impact of the plunger piston 68 as it reaches the bottom of its stroke, or if desired, the air flow out of the cylinder 82 beneath the piston 68 may be restricted to provide a cushion of air pressure to restrain the downward movement of the plunger piston 68.

As the plunger adapter 76 moves down with the plunger piston 68, the shoulders 122 and 152 return the plunger stop piston 70 and the thimble piston 72, respectively, to their original positions, along with the connected thimble 144 and plunger 77. Once the pistons 68, 70 and 72, the thimble 144 and the plunger 77 have reached this lowermost position, known as a transfer position, the invert arm 36 rotates the parisons 28 away toward the blow mold 39 (FIG. 1).

The use of the plunger stop piston 70 to position the plunger 77 in the counterblow position is a significant improvement over the effects of the springs used in the prior art plunger mechanisms. The plunger stop piston 70 can be repeatably positioned to halt the downward movement of the plunger 77 at the precise counterblow position required for forming the initial opening 42. Additionally a cushioned stop is achieved due to the low pressure air driving the plunger piston 68 downward and the arresting contact of the shoulder 122 with the pneumatically supported plunger stop piston 70. The cushioning provided by the pneumatic effect decreases the risk of mechanical failure of the elements of the plunger mechanism 20 due to hammering and fatigue of the elements which is common in prior art spring plunger mechanisms.

The details of a presently preferred embodiment of the press-and-blow plunger mechanism 52 are shown in FIG. 8. Many of the components of the plunger mechanism 52 shown in FIG. 8 are similar to or are the same as the components in the blow-and-blow plunger mechanism 50 shown in FIG. 4. Common components are identified by the same reference numbers in FIGS. 4 and 8, and similar components are denoted with a primed (') reference number if the component of the press-and-blow plunger mechanism 52 shown in FIG. 8 varies slightly from the corresponding component in the blow-and-blow plunger mechanism 50 shown in FIG. 4. As to these common and similar components, their nature and function may be comprehended from the abbreviated explanation provided below in conjunction with the press-and-blow plunger mechanism, taken in conjunction with the more complete explanation of the blow-and-blow plunger mechanism described above.

The press-and-blow plunger mechanism 52 includes two pistons, a plunger piston 68 and a thimble piston 72'. The housing for the plunger mechanism 52 is formed by the bottom end plate 86, the lower housing member 84, the stop plate 100', an upper housing member 134', and an upper end plate 136'. The plunger piston 68 moves vertically within the cylinder 82 and is attached to the plunger shaft 74. The center opening 92' within the shaft 74 fits over the center tube 90 and allows the shaft 74 to move vertically relative to the tube 90 within the cylinder 82. The stop plate 100' attaches to the top of the housing member 84 to define the upper end of the cylinder 82.

The upper housing member 134' is attached to the top of the stop plate 100'. The thimble piston 72' moves within a cylinder 132' defined at the bottom by the stop plate 100' and at the top by a shoulder 200 extending radially inward from the upper housing member 134'. The upper end plate 136' is attached to the top of the upper housing member 134' to complete the press and blow plunger mechanism 52. The thimble 144' is attached directly to the thimble piston 72' by a conventional connection not shown. The plunger adapter 76' is attached by a threaded connection to the upper end of the plunger shaft 74. The plunger adapter 76' has a greater annular diameter than the shaft 74, thereby forming an annular shoulder 122' at the threaded connection. The annular shoulder 122' is in a position to contact the upper surface of the thimble piston 72'.

A press-and-blow plunger 202 is attached directly to the top of the plunger adapter 76'. A base portion 204 of the plunger 202 is attached to the top surface of the adapter 76' by conventional means not shown.

Moving the thimble piston 72' upwards tends to raise the thimble 144' and the plunger 202 an equivalent amount when the shoulder 122' contacts the piston 72'. Once the thimble piston 72' and the thimble 144' reach their highest point, the plunger 202 may be raised further by energizing the plunger piston 68.

The plunger adapter 76' and plunger 202 move vertically within the open interior 150' of the annular thimble 144' while O rings 206 on the annular exterior of the adapter 76' create an airtight seal with the inner annular surface of the thimble 144'. To maintain pressure equilibrium above and below the adapter 76' and the plunger 202 in the open interior 150' of the thimble 144' as the adapter 76' and the plunger 202 move upward and downward, passages 208 are formed through the adapter 76' and the base portion 204 of the plunger 202 attached to the adapter 76'. The passages 208 angle radially outward and downward to a lower and outer beveled corner 210 of the adapter 76'. One or more ports 212 are formed through the wall of the thimble 144' at positions above the thimble piston 72'.

Upward movement of the plunger piston 68 is achieved by the admission of pressurized air through the passageway 104 in the lower end plate 86 into the cylinder 82 beneath the piston 68, while air in the cylinder 82 above the piston 68 is exhausted through the passageway 108 and elbow branch 110. Downward movement of the plunger piston 68 is achieved by reversing the flow of pressurized air and exhaust air.

Upward movement of the thimble piston 72' is achieved by the admission of pressurized air through the passageway 124' in the lower end plate 86, the lower housing member 84 and the stop plate 100' through the elbow branch 126' and into the cylinder 132' beneath the thimble piston 72' while air in the cylinder 132' above the piston 72' is exhausted through the passageway 158 and the elbow branch 160'. Downward movement of the thimble piston 72' is achieved by reversing the flow of pressurized air and exhaust air.

When the plunger piston 68 moves the adapter 76' upward with respect to the thimble piston 72', that air in the interior opening 150' of the thimble 144' above the adapter 76' and the plunger 202 is exhausted through the passages 208 to maintain pressure equilibrium. Similarly when the plunger piston moves the adapter 76' downward with respect to the thimble piston 72', pressure equilibrium is maintained by air flow through the passages 208. Additional pressure or vacuum by be applied through the ports 212 and the passageway 158 as desired during the formation of the parison.

To form a parison 28 in a press-and-blow operation, pressurized air is supplied to the passageways 93, 104, 108, 124' and 158, and the pistons 68 and 72' are appropriately manipulated as described below and as illustrated in FIGS. 9 to 11.

At the start of the press-and-blow operation shown in FIG. 9, pressurized air is introduced into the passageway 124'. The pressurized air then passes through the elbow branch 126' in the stop plate 100' and into the bottom of the cylinder 132' to move the thimble piston 72' upward. Air within the upper portion of the cylinder 132' is exhausted through the elbow branch 160' and the passageway 158. The upward movement of the thimble piston 72' places the sleeve 176' of the thimble 144' in contact with the guide ring 180 and positions the tip of the plunger 202 in the finish molding portion 37. This position is known as the load position.

The molten gob 27 is then delivered to the blank mold cavity 30', and the upper open end of the cavity 30' is sealed with the sealing member 186. Pressure is applied above the gob 27 and the fluid glass is forced about the plunger 202 and into the finish molding portion 37 to form the finish of the parison 28.

The next step in the sequence is shown in FIG. 10. Compressed air is applied through the passageway 104 to move the plunger piston 68 upward. As the plunger piston 68 travels upward to the full extent of its stroke, air within the upper portion of the cylinder 82 is exhausted through the passageway 108. The plunger adapter 76' moves upward through the interior opening 150' of the thimble 144' and presses the plunger 202 further upward into the blank mold cavity 30' as shown in FIG. 10. The air within the upper portion of the thimble 144' is vented through the passages 208 within the adapter 76' as the adapter 76' and plunger 202 move upward. The fluid glass expands to fill the cavity 30' and form the parison 28 as the plunger 202 is pressed into the cavity 30'. The thimble piston 72' remains in the upward position to maintain contact between the thimble 144' and the guide ring 180 within the neck ring 34, due to the continued application of air pressure through the passageway 124'. The position shown in FIG. 10 is known as the pressing position, and it is in this pressing position that the interior opening 42 is fully formed into the body of the parison 28.

The last step in the sequence is shown in FIG. 11. The pressurized air supplied to the underside of the pistons 68 and 72' is relieved, and pressurized air is applied through the passageway 108 and to the top of the plunger piston 68 to lower the plunger 202. To facilitate the lowering of the plunger adapter 76' toward the thimble piston 72' and to prevent the downward movement of the plunger 202 from pulling the fluid glass of the parison down with the retracting plunger, air within the annular region between the thimble 144' and the adapter 76' is vented through the passages 208 and the ports 212. Air is exhausted from the cylinder 132' beneath the piston 72' through the passageway 124'. With no pressurized air maintaining the thimble piston 72' in the up position, the pressurized air on the top of the plunger piston moves it downward, thereby lowering the thimble piston 72' once the shoulder 122' contacts the top surface of the thimble piston 72'. The air remaining in the lower portions of the cylinder 82 is exhausted through the passageway 104 as the piston 68 moves downward. Once the thimble 144' and the plunger 202 have been retracted to the transfer position shown in FIG. 11, the invert arm 36 moves the parisons 28 away for final forming in the blow mold 39 (FIG. 1).

The plunger 202 absorbs a great deal of heat energy while pressing the fluid glass in the blank mold cavity 30'. To cool the plunger 202 while it is in the pressing position, cooling air is applied through the passageway 93 to the center tube 90 and the center opening 92. The center opening 92 extends through the shaft 74 and the adapter 76' and into the plunger 202 to feed cooling air to the plunger 202 in a conventional manner.

One significant advantage of the press-and-blow plunger mechanism 52 over prior art press-and-blow plunger mechanisms is the pneumatic control over the pistons 68 and 72'. Prior art press-and-blow plunger mechanisms utilize springs to drive the plunger piston to the load position. These springs are expanded and compressed once during each cycle of the plunger mechanism. Since such a cycle is typically completed in approximately five seconds, the drive spring is subject to significant cyclic stress during operation of the plunger cylinder. Additionally, the abrupt movement of the spring tends to create a hammering effect between mechanical elements within the plunger mechanism as the plunger is extended into and retracted from the blank mold. The cushioning effect provided by the pneumatic operation of the pistons 68 and 72' tends to reduce the stress on the mechanical elements within the plunger cylinder and thus prolongs the life of the plunger cylinder.

Although the blow-and-blow and the press-and-blow plunger mechanisms 50 and 52, respectively, differ from an internal standpoint, the exterior configuration of each is similar. Accordingly either type of plunger mechanism 50 or 52 can be used with the plunger case assembly 22.

The details of a presently preferred embodiment of the plunger case assembly 22 are described and illustrated in FIGS. 2–4 and 12–14 in conjunction with the blow-and-blow plunger mechanism 50, but it should be understood that these details are equally applicable to the press-and-blow plunger assembly 52.

Among other functions, the primary functions of the plunger case assembly 22 are establishing and maintaining each of the plunger mechanisms at predetermined locations relative to the mold cavities 30 of the blank mold 32; supplying pressurized fluid, preferably air but other types of liquids or gasses may prove adaptable for use, to the plunger mechanisms; allowing adjustment of the plunger mechanisms to accommodate different types and sizes of blank molds 32, according to the type and characteristics of the parisons and bottles to be formed; allowing press-and-blow and blow-and-blow plunger mechanisms to be easily interchanged with one another in an IS; and allowing more convenient replacement or repair of the plunger mechanisms when needed.

The plunger case assembly 22 includes a basket 213 formed by side walls 214 and a bottom wall 216. The basket 213 has an open upper end 218 around which a flange plate 220 is connected. The flange plate 220 is connected to the frame member 24 of the IS 26 shown in FIG. 1. The basket 213 is thereby suspended from the frame member 24 without the need for the supporting foot which is commonly used in the prior art for connecting plunger mechanisms to the IS. Since no supporting foot is used, all of the components of the plunger case assembly 22 and the plunger mechanisms are not subject to the problems of misalignment typical in the prior art due to the contact of the supporting foot with the support surface for the IS. Instead the vibration and thermal effects have a substantially equal affect on the entire Section, including the plunger mechanisms and the plunger case assembly, and as a result the proper alignment is maintained.

A bottom base plate 221 is connected to the bottom wall 216 of the basket 213. An upper base plate 222 is inserted into the open upper end 218, followed by the halves of the ported block 66 and cylinder liner members 64. The upper base plate 222 supports the halves of the ported block 66 and the cylinder liner members 64. The two cylinder liner members 64, as well as the two halves of the ported block 66, when positioned adjacent to one another in a mated mirror image relationship within the open basket 213, are of a size to fit within the basket 213 with very close tolerances to the sidewalls 214. In addition, the tolerance between the sidewalls 214 and the upper base plate 222 is such that relative movement between the basket 213 and the upper base plate 222 may be achieved.

To move the upper base plate 222, ported block 66 and cylinder liner members 64 vertically in the basket 213, two threaded rods 223 and 224 are employed, as shown in FIGS. 2, 3 and 14. The rods 223 and 224 are rotatably connected to a mounting bracket 226. The mounting bracket 226 is connected to the bottom base plate 221, and bearings 228 in the mounting bracket 226 rotationally support the threaded rods 223 and 224 and also provide thrust support for vertical force applied on the rods 223 and 224.

The threaded rods 223 and 224 extend upwardly through holes 230 and 232 formed respectively in the bottom base plate 221 and the bottom wall 216 of the basket 213. A square threaded block 234 is rigidly retained in correspondingly shaped square holes 236 located in the upper base plate 222. A threaded hole in each block 234 is engaged by each of the threaded rods 223 and 224. The threaded blocks 234 are of a sufficient size to also extend through square holes 238 formed in the mated ported block halves 66. The square or rectangular configuration of the threaded blocks 234 in the holes 236 and 238 prevents them from rotating with rotation of the threaded rods 223 and 224. Openings 240 are also formed in the mated cylinder liner halves 64 to receive the threaded rods 223 and 224.

Drive gears 241 and 242 are fixed to the threaded rods 223 and 224, respectively, at a position below the bottom base plate 221 and above the mounting bracket 226. An intermediate gear 244 meshes with both of the drive gears 241 and 242. The intermediate gear 244 is also rotatably connected to the mounting bracket 226 by a bearing 245.

The lower end of the rod 223 extends below the mounting bracket 226, and a bevel gear 246 is connected to the lower end of the threaded rod 223. A second bevel gear 248 meshes with the first bevel gear 246. The second bevel gear 248 is connected to a shaft 250. The shaft 250 is rotatably supported by a bearing 252 in a flange 254 which is connected to the mounting bracket 226 as shown in FIG. 2. The other end of the shaft 250 preferably extends to the exterior of the IS where it is also suitably supported and rotated by conventional means.

Rotation of the shaft 250 rotates the gears 246 and 248 and causes rotation of the threaded rod 223. Upon rotation of the threaded rod 223, the drive gear 241 rotates the intermediate gear 244 and the intermediate gear 244 rotates the drive gear 242. Consequently, both threaded rods 223 and 224 rotate in unison in the same direction. Rotation of the threaded rods 223 and 224 advances the threaded blocks 234 up or down the threaded rods 223 and 224. This movement causes the upper base plate 222, the ported block halves 66 and the cylinder liner halves 64 to move vertically within the basket 213. As a result, the vertical position of each plunger mechanism located in the openings 62 of the cylinder liner halves 64 is adjusted vertically. In this manner, the plunger mechanisms 50 and 52 may be adjusted to a proper height relative to the neck ring 34 and the blank mold 32. Also, different plunger mechanisms having different strokes can readily be accommodated by the single plunger case assembly 22 as a result of this vertical adjustment capability.

Since the end of the shaft 250 can easily be turned from the exterior of the IS, the vertical adjustment of the plunger mechanisms is relatively easily achieved. This is a significant improvement over the prior art arrangements where the supporting foot typically had to be adjusted. Since the supporting foot was located below the plunger mechanisms in the interior of the IS, adjustment was difficult, tedious and time-consuming. The suspension of the plunger case assembly and the plunger mechanisms contained within it, and the means for conveniently adjusting the vertical position offers considerable convenience over the prior art support foot arrangements.

Another significant improvement associated with the plunger case assembly 22 and the plunger mechanisms 20 is the ability to communicate pressurized air to and from the plunger mechanisms in a manner which allows the plunger mechanisms to be replaced without disconnecting air lines or conduits. As a consequence, the plunger mechanisms can be quickly replaced.

As is best shown in FIGS. 12 and 14, circular ports 260 are formed in the sidewall of the portion of the ported block 66 which helps define the openings 62 below the cylinder liner halves 64. The ports 260 are at predetermined locations which adjoin the openings 106 formed in the plunger mechanism, when the plunger mechanism is seated atop the upper base plate 222 in the cylinder opening 62. A grommet 262 is located at the outer periphery of each port 260. The grommet 262 presses against both the ported block 66 and the exterior of the lower end plate 86 of the plunger mechanism 50 and 52 at a position surrounding each opening 106 and each port 260, to thereby seal the air communication path between the ported block 66 and the plunger mechanism.

The ported block halves 66 also include a plurality of annular holes 264 formed vertically through the halves 66. Channels 266 are formed in the ported block halves 66 between the ports 260 and the holes 264. As will be described below, air pressure is supplied into the holes 264, and the air pressure is communicated through the channels 266 to the ports 260. In some cases shown best in FIG. 12, the channels 266 must be cut vertically through the ported block halves. The channels 266 which extend vertically through the block halves 66 are sealed at the top against the bottom of the cylinder liner members 64 and at the bottom against the upper base plate 222. Neither the cylinder liner 64 nor the base plate 222 have openings formed therein at the location of the channels 266.

Pressurized air is supplied to the holes 264 and the channels 266 from an external controllable valving mechanism (not shown) which selectively supplies pressurized air through conventional air hoses 268. The hoses 268 are connected by connectors 270 to ports 272 formed in the bottom base plate 221. The ports 272 are connected to standpipes 274 which extend vertically upward from the ports 272. The standpipes 274 are connected to the bottom base plate 221 in an air tight manner by threading or seals (not shown). The standpipes 274 also extend vertically through openings 276 formed in the bottom wall 216 of the basket 213.

The standpipes 274 also continue upward into cylindrical conduits 278 in the cylinder liner halves 64. The conduits 278 are vertically aligned with holes 280 formed through the upper base plate 222 and the holes 264 formed in the ported block halves 66. The conduits 278 and the holes 264 and 280 have a larger diameter than the outer diameter of the standpipes 274, thereby providing an annular space between the standpipes 274 and the conduits 278 and the holes 264 and 280. This annular space is provided for the air to pass from the interior of the standpipes into the conduits 278 and to the holes 264. The air from the holes 264 flows through the channels 266 to the ports 260 and into the openings 106 of the plunger mechanisms.

Seals 282 maintain an airtight seal between the aligned holes 280 in the upper base plate 222 and the exterior of the standpipes 274, thus confining the airflow from the standpipes 274 to the holes 264 in the ported block halves 66. The seal in the hole 280 between the upper base plate 222 and the exterior of the standpipes 274 permits the relative vertical movement of the upper base plate 222 while maintaining the seal. In addition, seals (not shown) are also provided between the stacked together upper base plate 222, the ported block halves 66 and the bottom surface of the cylinder liners 64 to prevent leaks of air in the annular space surrounding the standpipes 274. Pressurized air delivered to plunger mechanisms 20 in this manner causes them to operate as described in detail above.

The length of the standpipes 274 is sufficient to achieve a full range of vertical movement of the upper base plate 222 and the plunger mechanisms retained in the cylindrical opening 62 within the basket 213. When the upper base plate 222 is at its lowest position within the basket 213, the standpipes 274 extend nearly to the top of the conduits 278 in the cylinder liner 64, leaving enough room at the top of each conduit 278 for air to enter or exit the top of the standpipes 274 and fill the annular space exterior to the standpipes 274. Alternatively, when the upper base plate 222 and the plunger mechanisms are at their highest position within the basket 213, the upper end of the standpipes 274 extend above the seal within the hole 280 in the upper base plate 222 to maintain communication into the conduits 278 and the holes 264 in the ported block halves 66. Thus, the upper end of the standpipes 274 are free to move vertically within the conduit 278 as the upper base plate 222, ported block 66 and cylinder liners 64 move up and down the full range of movement within the basket 213.

The hoses 268 attached to the stationary bottom base plate 221 may be rigid tubes as opposed to flexible hoses since they are not required to move up and down with the plunger mechanisms 20. This again is an improvement over the prior art where vertical adjustment of the plunger mechanisms usually required repositioning of the air hoses which supplied the plunger mechanisms. Additionally, since the hoses 264 are not attached directly to the plunger mechanisms, individual plunger mechanisms can be easily removed from the opening 62 by lifting the plunger mechanisms out of the openings 62 at the upper end of the adjoining cylinder liner members 64.

By alternative use of the plunger mechanisms 50 and 52, a single plunger case assembly 22 may be utilized in both blow and blow and press and blow parison forming operations. Only the plunger mechanisms 50 and 52 need be removed to change between blow and blow and press and blow operations. Furthermore, the suspended plunger case assembly 22 does not employ an adjustment foot which contacts the floor or frame of the IS, thereby avoiding the problems of frequent misalignment and problematic realignment prevalent with prior art plunger mechanisms. Vertical adjustments to accommodate different strokes and types of plunger mechanisms 50 and 52 are easily accomplished by the plunger case assembly 22 without elaborate mechanical effort.

The cushioning effect achieved by the fully pneumatic operation of the plunger mechanisms reduces the chances of mechanical failure of the internal plunger mechanism components. The pneumatic operation of the plunger mechanism of the present invention avoids the use of springs which are commonly used in prior art plunger mechanisms, thereby enhancing control over both the rate and the extent of plunger movement while decreasing the risk of mechanical failure. Should it become necessary to replace or repair a plunger mechanism 20 of the present invention, it is relatively convenient to simply remove the plunger mechanism from the cylinder 62 and replace it with another mechanism, thereby substantially reducing the down time of the Section. Many other advantages and improvements will be apparent to those skilled in the art upon full comprehension of the present invention.

Presently preferred embodiments of the present invention and many of its improvements have been described with a degree of particularity. The previous descriptions are of preferred examples for implementing the invention, and the scope of the invention should not necessarily be limited by this description. The scope of the present invention is defined by the following claims.

The invention claimed is:

1. A pneumatically operated plunger mechanism for use in an IS of a glassware forming machine to form a gob of fluid glass into a parison, comprising:

a housing having at least two cylinders, each cylinder containing a piston therein to allow movement of the piston along a length of the cylinder;

a plunger piston positioned in a first one of the cylinders to move in the first cylinder in a plunger stroke;

a plunger connected to the plunger piston to move between a retracted position relative to the housing to and a fully extended position upon movement of the plunger piston in the first cylinder;

a thimble piston positioned in a second one of the cylinders to move in the second cylinder in a thimble stroke;

a thimble connected to the thimble piston to move between a retracted position relative to the housing and a fully extended position upon movement of the thimble piston in the second cylinder;

air passageways in the housing to communicate pressurized air to the cylinders to move each piston in its cylinder along the stroke of each piston; and the thimble, the thimble piston, the plunger and the plunger piston interoperatively connected with one another to move the plunger from its retracted position to an intermediate extended position upon movement of the thimble from its retracted position to its fully extended position upon application of pressurized air to the second cylinder and without application of pressurized air to the first cylinder, to move the plunger to its fully extended position upon the application of pressurized air to the first cylinder, and to move the plunger and the thimble to their retracted positions upon application of pressurized air to the first cylinder.

2. A pneumatically operated plunger mechanism as defined in claim 1 for use in forming a type of parison which has a body portion, a neck and mouth portion, and an initial interior opening extending through the neck and mouth portion and into the body portion, wherein:

the plunger is initially extended into the gob of fluid glass to form the neck and mouth portion of the parison and to form a cavity in the body portion of the parison;

the plunger is moved to its retracted position after completion of the parison;

the thimble is moved to its retracted position after completion of the parison; and the retracted positions of the plunger and the thimble allow the parison to be transferred within the IS.

3. A plunger mechanism as defined in claim 2 for use in an IS of a type comprising a neck ring having a molding portion for molding the neck and mouth portion of the parison, a blank mold having a blank mold cavity for molding the body portion of the parison, and a guide ring for guiding the plunger into the neck and mouth molding portion of the neck ring, wherein:

the thimble includes a sleeve portion which contacts the guide ring when the thimble is in its fully extended position.

4. A plunger mechanism as defined in claim 3 wherein:

the housing is generally of an elongated tubular shape extending in an axial dimension;

the first and second cylinders are generally aligned with each other along the axial dimension in the housing; and the pistons move axially within the cylinders in the housing.

5. A plunger mechanism as defined in claim 2 used in a blow-and-blow parison forming operation, wherein:

the fully extended position of the plunger defines a load position of the plunger in which the plunger is initially extended into the gob of fluid glass;

the intermediate extended position of the plunger defines a counterblow position; and the housing includes a third cylinder; and further comprising:

a plunger stop piston positioned in the third cylinder, the plunger stop piston moving longitudinally in the third cylinder over a distance defining a plunger stop stroke;

the plunger stop piston, the plunger piston and the plunger interoperatively connected with one another to position the plunger in the counterblow position after formation of the cavity, the plunger stop piston moving to an end of the plunger stop stroke upon application of pressurized air to the third cylinder to prevent the plunger from being retracted beyond the counterblow position, the counterblow position of the plunger allowing the plunger to deliver pressurized counterblow air to expand the cavity and form the initial interior opening of the parison; and the interoperative connection of the plunger stop and plunger pistons further allowing the plunger piston and the plunger stop piston to move independently of one another to establish the counterblow position of the plunger upon application of pressurized air to the first and third cylinders, respectively.

6. A plunger mechanism as defined in claim 5 wherein:

the housing is generally of an elongated tubular shape extending in an axial dimension from a bottom end to a top end;

the first, second and third cylinders are generally aligned with one another along the axial dimension in the housing;

the pistons move axially within the cylinders in the housing;

the plunger further includes a counterblow port through which the pressurized counterblow air is delivered to expand the cavity and form the initial interior opening of the parison; and further comprising:

a counterblow air channel extending axially from the bottom of the housing through the plunger and communicating with the counterblow port to convey the pressurized counterblow air to the counterblow port.

7. A plunger mechanism as defined in claim 6 wherein:

the counterblow air channel extends axially through the pistons and cylinders in the housing.

8. A plunger mechanism as defined in claim 5 wherein:

the housing is generally of an elongated tubular shape extending in an axial dimension from a bottom end to a top end;

the first, second and third cylinders are generally aligned with one another along the axial dimension in the housing;

the plunger, thimble and piston stop pistons move axially within the first, second and third cylinders in the housing, respectively;

the thimble piston and the second cylinder are located adjacent to the top end of the housing;

the plunger piston and the first cylinder are located adjacent the bottom end of the housing;

the plunger stop piston and the third cylinder are located in the housing below the thimble piston and the second cylinder and above the plunger piston and the first cylinder; and further comprising:

a shaft extending upward from the plunger piston;

the plunger stop piston includes a center opening through which the shaft of the plunger piston extends, the plunger stop piston moving relative to the shaft;

a plunger adapter connected to an upper end of the shaft at a lower end of the plunger adapter, the plunger adapter connected to the plunger at an upper end of the plunger adapter;

the thimble piston includes a center opening through which the plunger adapter extends, the thimble piston moving relative to the plunger adapter;

the thimble includes a center opening through which an upper end of the plunger extends, the thimble moving relative to the plunger;

an opening for communicating the pressurized counterblow air through the plunger piston, the shaft, the plunger adapter and into the plunger; and a counterblow port formed within the plunger, the counterblow port extending from the counterblow air communicating opening to an exterior of the plunger through which the pressurized counterblow air is delivered to expand the cavity and form the initial interior opening of the parison.

9. A plunger mechanism as defined in claim 8 wherein:

the opening for communicating the pressurized counterblow air extends along a center axis through the housing.

10. A plunger mechanism as defined in claim 8 wherein:

the thimble includes an open interior portion; and the connection of the plunger to the upper end of the plunger adapter is located within the open interior portion of the thimble.

11. A plunger mechanism as defined in claim 2 used in a press-and-blow operation wherein:

the intermediate extended position of the plunger defines a load position of the plunger in which the plunger is initially extended into the gob of fluid glass;

the fully extended position of the plunger defines a pressing position of the plunger; and movement of the plunger to the pressing position from the load position expands the cavity and forms the initial interior opening of the parison; and the interoperative connection of the plunger and thimble pistons further allowing the plunger piston and the thimble piston to move independently of one another to establish the pressing position of the plunger upon application of pressurized air to the first and second cylinders, respectively.

12. A plunger mechanism as defined in claim 11 wherein:

the thimble includes a center opening through which a main portion of the plunger extends, the thimble moving relative to the plunger;

the thimble includes an open interior portion;

the plunger includes a base portion located within the open interior portion of the thimble; and the plunger includes a passage formed therein to establish air pressure equilibrium between the open interior portion of the thimble and the initial interior opening of the parison as the plunger moves between the load position and the pressing position.

13. A plunger mechanism as defined in claim 12 further comprising:

a plunger adapter located within the open interior portion of the thimble, the plunger adapter operatively connecting the base portion of the plunger with the plunger piston; and wherein:

the plunger adapter further includes a seal extending between the plunger adapter and the thimble in the open interior portion of the thimble; and the passage extends through the plunger adapter and the base portion of the plunger from a point above the seal to a point below the seal in the open interior portion of the thimble.

14. A plunger mechanism as defined in claim 13 further comprising:

a shaft extending upward from the plunger piston; and wherein:

the housing is generally of an elongated tubular shape extending in an axial dimension from a bottom end to a top end;

the first and second cylinders are generally aligned with each other along the axial dimension in the housing;

the plunger and thimble pistons move axially within the first and second cylinders in the housing, respectively;

the thimble piston and the second cylinder are located adjacent to the top end of the housing;

the plunger piston and the first cylinder are located adjacent to the bottom end of the housing;

the thimble piston includes a center opening through which the shaft of the plunger piston extends, the thimble piston moving relative to the shaft; and the plunger adapter is connected to an upper end of the shaft at a lower end of the plunger adapter and the plunger adapter is connected to the base portion of the plunger at an upper end of the plunger adapter.

15. A plunger mechanism as defined in claim 14 further comprising:

a cooling air opening for communicating cooling air to the plunger, the cooling air opening extending through the plunger piston, the shaft, the plunger adapter and into the plunger.

16. A plunger mechanism as defined in claim 15 wherein:

the cooling air opening extends along a center axis through the housing.

17. A pneumatically operated plunger mechanism as defined in claim 2 used in a blow-and-blow parison forming operation, further comprising:

a counterblow port formed in the plunger; and a counterblow air channel extending from the housing through the plunger to each counterblow port to convey pressurized counterblow air to the counterblow port; and wherein:

the fully extended position of the plunger defines a load position of the plunger in which the plunger is initially extended into the gob of fluid glass;

the intermediate extended position of the plunger defines a counterblow position of the plunger; and movement of the plunger from the load position to the counterblow position allows pressurized counterblow air to be delivered through the counterblow air channel and from the counterblow port to expand the cavity and form the initial interior opening of the parison.

18. A pneumatically operated plunger mechanism as defined in claim 17, wherein:

the housing includes a third cylinder; and further comprising:

a plunger stop piston positioned in the third cylinder to move in the third cylinder in a plunger stop stroke;

the plunger stop piston, the plunger piston and the plunger interoperatively connected with one another to position the plunger in the counterblow position upon movement of the plunger stop piston to a fully extended position along the plunger stop stroke.

19. A pneumatically operated plunger mechanism as defined in claim 18, wherein:

the plunger stop piston moves in the plunger stop stroke upon application of pressurized air to the third cylinder to prevent the plunger from being retracted beyond the counterblow position.

20. A pneumatically operated plunger mechanism as defined in claim 18, wherein:

the plunger is in the load position; and the interoperatively connected plunger stop piston, plunger piston and plunger allow application of pressurized air to the third cylinder to move the plunger stop piston to the fully extended position in the plunger stop stroke which establishes the counterblow position for the plunger and further allowing application of pressurized air to the first cylinder to move the plunger from the load position to the counterblow position where the plunger engages the plunger stop piston.

21. A pneumatically operated plunger mechanism as defined in claim 20, wherein:

the interoperatively connected plunger stop piston and plunger piston allow the plunger piston and the plunger stop piston to move independently of one another to establish the counterblow position of the plunger upon application of pressurized air to the first and third cylinders, respectively.

22. A pneumatically operated plunger mechanism as defined in claim 20, wherein:

the housing is generally of an elongated tubular shape extending in an axial dimension;

the first, second and third cylinders are generally aligned with one another along the axial dimension in the housing; and the pistons move axially within the cylinders upon application of pressurized air to the cylinders containing the pistons.

23. A pneumatically operated plunger mechanism as defined in claim 2 used in a press-and-blow parison forming operation, wherein:

the intermediate extended position of the plunger defines a load position of the plunger in which the plunger is initially extended into the gob of fluid glass;

the fully extended position of the plunger defines a pressing position of the plunger; and movement of the plunger from the load position to the pressing position by application of pressurized air to the first cylinder expands the cavity and forms the initial interior opening of the parison.

24. A pneumatically operated plunger mechanism as defined in claim 23, wherein:

the interoperatively connected thimble piston, thimble, plunger piston and plunger allow the plunger and the thimble to move independently of one another to establish the pressing position of the plunger upon application of pressurized air to the first and second cylinders, respectively.

25. A pneumatically operated plunger mechanism as defined in claim 23, for use with an IS of the type having a a blank mold having a blank mold cavity for molding the body portion of the parison, wherein:

movement of the plunger to the pressing position from the load position forms the body portion by pressing the fluid glass into the blank mold cavity.

26. A pneumatically operated plunger mechanism as defined in claim 23, wherein:

the thimble includes an open interior portion formed therein;

the thimble remains in its fully extended position as the plunger moves between the load position and the pressing position;

a portion of the plunger moves within the open interior portion of the thimble as the plunger moves between the load position and the pressing position; and the plunger includes a passage formed therein to establish air pressure equilibrium between the center opening of the thimble and the initial interior opening of the parison as the plunger moves between the load position and the pressing position.

27. A pneumatically operated plunger mechanism as defined in claim 26, wherein:

the plunger further includes a seal extending between the plunger and the thimble in the open interior portion of the thimble; and the passage within the plunger extends from a point above the seal to a point below the seal.

28. A pneumatically operated plunger mechanism as defined in claim 23, further comprising:

a cooling air opening formed in the plunger to communicate cooling air to the plunger.

29. A pneumatically operated plunger mechanism as defined in claim 28, wherein:

the housing is generally of an elongated tubular shape extending in an axial dimension from a bottom end to a top end;

the plunger piston and the thimble piston move axially within the first and second cylinders in the housing, respectively;

the first and second cylinders are generally aligned with each other along the axial dimension in the housing;

the thimble piston and the second cylinder are located adjacent to the top end of the housing;

the plunger piston and the first cylinder are located adjacent to the bottom end of the housing;

the thimble piston includes a center opening formed therethrough; and further comprising:

a shaft extending upward from the plunger piston and through the center opening in the thimble piston, the thimble piston moving relative to the shaft, the plunger connected to an upper end of the shaft; and wherein:

the cooling air opening is formed through the shaft.

30. In combination, a plunger mechanism as defined in claim 1 and a plunger case assembly for use in positioning the plunger mechanism in an IS, wherein:

the IS includes a blank mold having a blank mold cavity in which a body portion of the parison is formed; and the plunger case assembly comprises:

a liner member having a plunger opening formed therein to receive the plunger mechanism;

a ported block associated with the liner member and having a plurality of ports formed therein for delivering pressurized air; and wherein:

the plunger mechanism is positioned in a seated condition in the plunger opening in the liner member; and the ports in the ported block communicate with the air passageways in the housing when the plunger mechanism is seated in the plunger opening.

31. A plunger mechanism in combination with a plunger case assembly as defined in claim 30 wherein:

the plunger mechanism is moveable into and out of the plunger opening from a top end of the liner member; and wherein the plunger case assembly further comprises:

sealing means surrounding each port of the ported block and an opening into each air passageway in the housing when the plunger mechanism is in the seated condition in the liner member.

32. A plunger mechanism in combination with a plunger case assembly as defined in claim 31 for use with an IS of a type which has a frame, and wherein the plunger case assembly further comprises:

a basket containing an interior in which the liner member, the plunger mechanism and the ported block are positioned; add means for attaching the basket to the frame of the IS to suspend the basket from the frame of the IS without any direct connection between the plunger mechanism and a support surface upon Which the IS is positioned.

33. A plunger mechanism in combination with a plunger case assembly as defined in claim 32 wherein the plunger case assembly further comprises:

means connected to the basket for raising and lowering the liner member and the ported block and the plunger mechanism positioned in the seated condition in the plunger opening to adjust the position of the plunger relative to the blank mold cavity.

34. A plunger mechanism in combination with a plunger case assembly as defined in claim 33 wherein:

the plunger case assembly further comprises an upper base plate located in the interior of the basket, the upper base plate supporting the ported block, the liner member and the plunger mechanism;

the raising and lowering means includes a threaded rod rotatably mounted to the basket, the threaded rod engaging a threaded portion of the upper base plate to raise and lower the upper base plate, the ported block, the liner member and the plunger mechanism relative to the basket upon rotation of the threaded rod; and the plunger case assembly includes means connected to the basket for rotating the threaded rod from an exterior of the basket.

35. A plunger mechanism in combination with a plunger case assembly as defined in claim 33 wherein the plunger case assembly further comprises:

means for establishing a conduit for the passage of pressurized air from a stationary location at an exterior of the basket to the ports of the ported block during raising and lowering of the liner member, the ported block and the plunger mechanism.

36. A plunger mechanism in combination with a plunger case assembly as defined in claim 35 wherein the plunger case assembly further comprises:

an upper base plate located in the interior of the basket and supporting the ported block, the liner member and the plunger mechanism;

a lower base plate stationarily attached to an exterior of the basket at a position below the upper base plate;

a plurality of tubular standpipes connected to the lower base plate and extending into the interior of the basket, each standpipe having an interior opening extending therealong;

a hole formed in the upper base plate through which each standpipe extends;

a hole formed in the ported block into which each standpipe extends;

a communication channel formed in the ported block between each hole in the ported block and each port of the ported block through which pressurized air flows between the hole and the port;

base plate ports formed in the lower base plate for communicating pressurized air to the interior openings of the standpipes; and sealing means operative between each of the standpipes and at least one of the holes in the ported block or the holes in the upper base plate for confining the pressurized air delivered from the interior openings of the standpipes to the holes, the communication channels and the ports in the ported block.

37. A plunger mechanism in combination with a plunger case assembly as defined in claim 36 wherein the plunger case assembly further comprises:

a conduit formed in the liner member into which an open upper end of each standpipe extends during the raising and lowering movement, the conduit having a cross sectional size to provide an area at an exterior of the standpipe within which pressurized air from the interior opening of the standpipe is delivered; and wherein:

the hole formed in the ported block into which each standpipe extends has a cross sectional size to provide an area at the exterior of the standpipe within which pressurized air from the interior opening of the standpipe is delivered prior to communication with the communication channel in the ported block.

38. A plunger mechanism in combination with a plunger case assembly as defined in claim 37 wherein:

the raising and lowering means includes a threaded rod rotatably mounted to the basket, the threaded rod engaging a threaded portion of the upper base plate to raise and lower the upper base plate, the ported block, the liner member and the plunger mechanism relative to the basket upon rotation of the threaded rod; and the plunger case assembly includes means connected to an exterior of the basket for rotating the threaded rod.

39. A pneumatically operated plunger mechanism as defined in claim 1, wherein:
 the interoperatively connected thimble, thimble piston, plunger and plunger piston allow pressurized air to be applied in the second cylinder to create a cushioning force which partially opposes movement of the plunger and the thimble to their retracted positions.

40. A pneumatically operated plunger mechanism as defined in claim 1, wherein:
 the interoperatively connected thimble, thimble piston, plunger and plunger piston allow the plunger piston to move the plunger and the thimble to their retracted positions without application of pressurized air to the second cylinder to assist in moving the thimble to its retracted position.

41. A pneumatically operated plunger mechanism as defined in claim 1 for use with an IS of a type which includes a blank mold having a blank mold cavity in which a body portion of the parison is formed; wherein:
 the housing includes a plurality of ports through which to communicate the pressurized air to the air passageways; and further comprising in combination with the plunger mechanism:
 a plunger case assembly for positioning the plunger mechanism in the IS, the plunger case assembly comprising:
 a liner member having a plunger opening extending into the liner member from a top end of the liner member, the plunger opening receiving the plunger mechanism and seating the plunger mechanism in the liner member;
 a plurality of ports formed in the liner member to communicate the pressurized air to the ports in the housing when the plunger mechanism is seated in the liner member; and
 the plunger mechanism is moveable into and out of the plunger opening from the top end of the liner member.

42. In combination, a pneumatically operated plunger mechanism and a plunger case assembly as defined in claim 41, further comprising:
 sealing means surrounding the ports in the housing and in the liner member.

43. In combination, a pneumatically operated plunger mechanism and a plunger case assembly as defined in claim 41 for use with an IS of the a type which is supported on a support surface and has a frame; wherein:
 the plunger case assembly is attached to the frame of the IS to position the plunger mechanism beneath the blank mold cavity without a direct connection between the plunger mechanism and the support surface.

44. A pneumatically operated plunger mechanism in combination with a plunger case assembly as defined in claim 43 wherein the plunger case assembly further comprises:
 means for raising and lowering the liner member and the seated plunger mechanism to adjust the position of the plunger relative to the blank mold cavity.

45. In combination, a pneumatically operated plunger mechanism and a plunger case assembly as defined in claim 41 in which the IS is supported on a support surface, the IS has a frame, and wherein the plunger case assembly further comprises:
 a basket having an interior into which the liner member is positioned, the basket attached to and suspended from the frame of the IS to position the liner member and the seated plunger mechanism beneath the blank mold cavity without direct connection between the plunger mechanism and the support surface.

46. A pneumatically operated plunger mechanism in combination with a plunger case assembly as defined in claim 45 wherein the plunger case assembly further comprises:
 means connected to the basket for raising and lowering the liner member and the seated plunger mechanism to adjust the position of the plunger relative to the blank mold cavity.

47. A pneumatically operated plunger mechanism in combination with a plunger case assembly as defined in claim 46 wherein:
 the raising and lowering means includes a threaded rod rotatably mounted to the basket, the threaded rod engaging a threaded portion of the liner member to raise and lower the liner member relative to the basket upon rotation of the threaded rod.

48. A pneumatically operated plunger mechanism in combination with a plunger case assembly as defined in claim 46 further comprising:
 means for establishing a conduit for delivering the pressurized air from a stationary location at an exterior of the basket to the ports of the liner member during raising and lowering of the liner member.

49. A method of forming a gob of fluid glass into a parison in an IS of a glassware forming machine of a type having a blank mold in which the gob is formed into the parison, comprising the steps of:
 providing a pneumatically operated plunger mechanism comprising a housing having at least two cylinders, a plunger piston positioned in a first one of the cylinders to move in a plunger stroke, a thimble piston positioned in a second one of the cylinders to move in a thimble stroke, a plunger connected to the plunger piston to move between a retracted position relative to the housing and a fully extended position with movement of the plunger piston in the first cylinder, a thimble connected to the thimble piston to move between a retracted position relative to the housing and a fully extended position, and air passageways within the housing to communicate pressurized air to the cylinders to move each piston along its stroke;
 positioning the plunger mechanism relative to the blank mold to allow movement of the plunger and the thimble with respect to the blank mold;
 inserting a gob of glass into the blank mold prior to the formation of the parison;
 removing the parison from the blank mold after it is formed; and
 forming the gob into the parison while the glass is in the blank mold by steps comprising:
 moving the plunger from its retracted position to an intermediate extended position and moving the thimble from its retracted position to its fully extended position by applying pressurized air to the second cylinder and without applying pressurized air to the first cylinder;
 moving the plunger to its fully extended position by applying pressurized air to the first cylinder; and
 moving the plunger and the thimble to their retracted positions by applying pressurized air to the first cylinder.

33

50. A method as defined in claim 49, further comprising the step of:
applying pressurized air in the second cylinder to create a cushioning force which partially opposes movement of the plunger and the thimble to their retracted positions.

51. A method as defined in claim 49, further comprising the step of:
moving the plunger and the thimble to their retracted positions without applying pressurized air to the second cylinder to assist in moving the thimble to its retracted position.

52. A method as defined in claim 49 further comprising the steps of:
forming the parison with a body portion, a neck and mouth portion, and an initial interior opening extending through the neck and mouth portion and into the body portion;
initially extending the plunger into the gob of fluid glass to form the neck and mouth portion of the parison and to form a cavity in the body portion of the parison;
moving the plunger to its retracted position after forming the parison;
moving the thimble to its retracted position after forming the parison; and
transferring the parison within the IS after the plunger and the thimble have moved to their retracted positions.

53. A method as defined in claim 52 used in a blow-and-blow parison forming operation, wherein the fully extended position of the plunger defines a load position of the plunger in which the plunger is initially extended into the gob of fluid glass, and the intermediate extended position of the plunger defines a counterblow position of the plunger, and further comprising the steps of:
providing the plunger with a counterblow port formed therein;
providing the plunger mechanism with a counterblow air channel extending from the housing through the plunger to communicate with the counterblow port;
moving the plunger from the load position to the counterblow position; and
delivering pressurized counterblow air through the counterblow air channel and from the counterblow port after the plunger has moved to its counterblow position to expand the cavity and form the initial interior opening of the parison.

54. A method as defined in claim 53, further comprising the steps of:
providing the housing of the plunger mechanism with a third cylinder;
providing a plunger stop piston positioned in the third cylinder to move in the third cylinder in a plunger stop stroke; and
moving the plunger stop piston to a fully extended position in the plunger stop stroke prior to moving the plunger from the load position to the counterblow position.

55. A method as defined in claim 54, further comprising the step of:
preventing the plunger from being retracted beyond the counterblow position by applying pressurized air to the third cylinder to maintain the plunger stop piston in its fully extended position.

34

56. A method as defined in claim 54, further comprising the steps of:
moving the plunger stop piston to the fully extended position by applying pressurized air to the third cylinder; and
moving the plunger to the counterblow position established by the plunger stop piston by applying pressurized air to the first cylinder.

57. A method as defined in claim 56, further comprising the step of:
moving the plunger and plunger stop pistons independently of one another to establish the counterblow position of the plunger by independently applying pressurized air to the first and third cylinders, respectively.

58. A method as defined in claim 56, further comprising the steps of:
providing the housing of the plunger mechanism with a generally elongated tubular shape extending in an axial dimension, the first, second and third cylinders generally aligned with one another along the axial dimension in the housing; and
moving the pistons axially within the cylinders.

59. A method as defined in claim 52 used in a press-and-blow parison forming operation, wherein the intermediate extended position of the plunger defines a load position of the plunger in which the plunger is initially extended into the gob of fluid glass, and the fully extended position of the plunger defines a pressing position of the plunger; and further comprising the step of:
moving the plunger from the load position to the pressing position to expand the cavity and form the initial interior opening of the parison.

60. A method as defined in claim 59, further comprising the step of:
moving the plunger to its fully extended position by independently applying pressurized air to the first and second cylinders.

61. A method as defined in claim 59, further comprising the steps of:
providing a neck ring of the IS having a molding portion for molding the neck and mouth portion of the parison;
providing a blank mold cavity within the blank mold for molding the body portion of the parison;
moving the plunger to the pressing position from the load position to form the body portion by pressing the fluid glass into the blank mold cavity.

62. A method as defined in claim 59, further comprising the steps of:
providing the thimble with an open interior portion;
providing the plunger with an equilibrium passage extending between the open interior portion of the thimble and the initial interior opening of the parison;
moving a portion of the plunger into the open interior portion of the thimble by moving the plunger between the load and pressing positions; and
conducting air pressure through the equilibrium passage as the plunger moves between the load position and the pressing position to establish air pressure equilibrium between the open interior portion of the thimble and the initial interior opening of the parison.

63. A method as defined in claim 62, further comprising the step of:
providing the plunger with a seal extending between the plunger and the thimble in the open interior portion of the thimble, and wherein the equilibrium passage within the plunger extends from a point above the seal to a point below the seal.

64. A method as defined in claim 59, further comprising the steps of:
providing the plunger with a cooling air opening formed therein; and
supplying cooling air to the cooling air opening to cool the plunger.

65. A method as defined in claim 64, further comprising the steps of:
providing the housing of the plunger mechanism with a generally elongated tubular shape extending in an axial dimension from a bottom end to a top end, the first and second cylinders generally aligned with each other along the axial dimension in the housing so that the thimble piston and the second cylinder are located adjacent to the top end of the housing and the plunger piston and the first cylinder are located adjacent to the bottom end of the housing;
moving the plunger piston and the thimble piston axially within the first and second cylinders, respectively;
providing the thimble piston with a center opening formed therethrough;
providing the plunger piston with a shaft extending upward from the plunger piston and through the center opening in the thimble piston;
connecting the plunger to an upper end of the shaft;
extending the cooling air opening within the plunger to pass through the shaft; and
moving the thimble piston relative to the shaft by applying pressurized air to the second cylinder.

66. A method as defined in claim 40 further comprising the steps of:
providing the housing of the plunger mechanism with a plurality of ports through which to communicate the pressurized air to the air passageways within the housing;
providing a plunger case assembly in combination with the plunger mechanism, the plunger case assembly including a liner member having a plunger opening extending into the liner member from a top end of the liner member, the plunger opening receiving the plunger mechanism and seating the plunger mechanism in the liner member, and the liner member further including a plurality of ports formed therein to communicate the pressurized air to the ports in the housing when the plunger mechanism is seated in the liner member; and
positioning the plunger mechanism in the IS by moving the plunger mechanism into and out of the plunger opening from the top end of the liner member.

67. A method as defined in claim 66, further comprising the step of:
providing the plunger case assembly with a seal surrounding the ports in the housing and in the liner member.

68. A method as defined in claim 66 in which the IS is supported on a support surface, the IS has a frame, and further comprising the step of:
attaching the plunger case assembly to the frame of the IS to position the plunger mechanism beneath the blank mold without directly connecting the plunger mechanism and the support surface.

69. A method as defined in claim 68 further comprising the step of:
raising and lowering the liner member and the seated plunger mechanism to adjust the position of the plunger relative to the blank mold.

70. A method as defined in claim 66 in which the IS is supported on a support surface, the IS has a frame, and further comprising the steps of:
providing the plunger case assembly with a basket having an interior;
suspending the basket from the frame of the IS; and
placing the liner member and the seated plunger mechanism in the basket to position the plunger mechanism beneath the blank mold without directly connecting the plunger mechanism and the support surface.

71. A method as defined in claim 70 further comprising the step of:
raising and lowering the liner member and the seated plunger mechanism in the basket to adjust the position of the plunger relative to the blank mold.

72. A method as defined in claim 71 further comprising the step of:
delivering the pressurized air from a stationary location at the exterior of the basket to the ports of the liner member during raising and lowering of the liner member and the yeated plunger mechanism.

* * * * *